(12) United States Patent
Kullberg

(10) Patent No.: US 10,334,778 B2
(45) Date of Patent: Jul. 2, 2019

(54) QUICK LOADING TRIMMER HEAD

(71) Applicant: HUSQVARNA AB, Huskvarna (SE)

(72) Inventor: Stefan Kullberg, Jönköping (SE)

(73) Assignee: HUSQVARNA AB, Huskvarna (SE)

( * ) Notice: Subject to any disclaimer, the term of this patent is extended or adjusted under 35 U.S.C. 154(b) by 23 days.

(21) Appl. No.: 15/540,394

(22) PCT Filed: Nov. 18, 2015

(86) PCT No.: PCT/EP2015/076998
§ 371 (c)(1),
(2) Date: Jun. 28, 2017

(87) PCT Pub. No.: WO2016/107695
PCT Pub. Date: Jul. 7, 2016

(65) Prior Publication Data
US 2017/0354089 A1    Dec. 14, 2017

Related U.S. Application Data

(63) Continuation of application No. 14/584,270, filed on Dec. 29, 2014.

(51) Int. Cl.
*A01D 34/416*    (2006.01)
*A01D 34/90*    (2006.01)

(52) U.S. Cl.
CPC ....... *A01D 34/4161* (2013.01); *A01D 34/416* (2013.01); *A01D 34/4162* (2013.01); *A01D 34/4163* (2013.01); *A01D 34/90* (2013.01)

(58) Field of Classification Search
CPC .............. A01D 34/4161; A01D 34/416; A01D 34/4162; A01D 34/4163; A01D 34/90
See application file for complete search history.

(56) References Cited

U.S. PATENT DOCUMENTS

| 4,095,338 A | 6/1978 | Naohiko et al. |
| 4,254,550 A | 3/1981 | Satoh |
| (Continued) | | |

FOREIGN PATENT DOCUMENTS

| AU | 2007315691 B2 | 10/2012 |
| CN | 101553107 A | 10/2009 |
| (Continued) | | |

OTHER PUBLICATIONS

International Search Report and Written Opinion for International Application No. PCT/EP2014/055819 dated Nov. 19, 2014.

(Continued)

*Primary Examiner* — Hwei-Siu C Payer
(74) *Attorney, Agent, or Firm* — Burr Forman McNair

(57) ABSTRACT

A hand-held cutting device (10) including an elongated member (45) graspable along a portion thereof by an operator, a trimmer head (25) disposed at one end of the elongated member, and a power unit operably coupled to the trimmer head to selectively cause rotation of the trimmer head, wherein the trimmer head comprises a line holding assembly (110) to hold and selectively release the trimmer line (70) and a housing to house the line holding assembly, wherein the line holding assembly includes a core (340) having a first portion (342) and a second portion (350), and a spool (130) configured to hold trimmer line that is operably coupled to the core, and wherein the second portion of the core is non-rotatably fixed to the first portion of the core when the trimmer head is in an at-rest state, and is rotatable with respect to the first position of the core when the trimmer head is in an in-use state and rotating.

18 Claims, 16 Drawing Sheets

(56) References Cited

U.S. PATENT DOCUMENTS

| | | |
|---|---|---|
| 4,561,180 A | 12/1985 | Pittinger, Sr. et al. |
| 4,599,796 A | 7/1986 | Baba |
| 4,660,286 A | 4/1987 | Engelbrecht et al. |
| 4,702,005 A * | 10/1987 | Pittinger, Sr. ...... A01D 34/4163 30/276 |
| 4,823,465 A | 4/1989 | Collins |
| 4,926,557 A | 5/1990 | Haupt |
| 4,942,664 A | 7/1990 | Zatulovsky |
| 5,020,223 A | 6/1991 | Desent et al. |
| 5,109,607 A | 5/1992 | Everts |
| 5,136,782 A | 8/1992 | Calcinai |
| 5,765,287 A | 6/1998 | Griffini et al. |
| 5,806,192 A | 9/1998 | Everts et al. |
| 6,148,523 A | 11/2000 | Everts et al. |
| 6,263,580 B1 | 7/2001 | Stark et al. |
| 6,446,345 B1 | 9/2002 | Tsunoda et al. |
| 6,944,954 B1 | 9/2005 | Ametoli |
| 6,952,877 B2 | 10/2005 | Pfaltzgraff |
| 7,111,403 B2 | 9/2006 | Moore |
| 7,412,768 B2 | 8/2008 | Alliss |
| 7,640,668 B2 | 1/2010 | Iacona |
| 7,762,002 B2 | 7/2010 | Proulx |
| 7,797,839 B2 | 9/2010 | Proulx |
| 7,979,991 B2 | 7/2011 | Pfaltzgraff |
| 8,025,249 B2 | 9/2011 | Alliss et al. |
| 8,266,805 B1 | 9/2012 | Alliss |
| 8,307,558 B2 | 11/2012 | Alliss |
| 8,464,431 B2 | 6/2013 | Reynolds et al. |
| 8,510,960 B2 | 8/2013 | Pfaltzgraff et al. |
| 8,549,827 B2 | 10/2013 | Kato et al. |
| 9,380,743 B2 | 7/2016 | Alliss |
| 2004/0134078 A1 | 7/2004 | Pfaltzgraff |
| 2008/0052917 A1 | 3/2008 | Proulx |
| 2008/0120847 A1 | 5/2008 | Alliss |
| 2010/0083506 A1 | 4/2010 | Bennett |
| 2011/0119932 A1 | 5/2011 | Pfaltzgraff et al. |
| 2011/0225832 A1 | 9/2011 | Alliss |
| 2011/0302793 A1 | 12/2011 | Alliss |
| 2012/0255182 A1 | 10/2012 | Kato |
| 2015/0264861 A1 | 9/2015 | Kullberg |
| 2015/0327436 A1 | 11/2015 | Skinner et al. |
| 2015/0342116 A1 | 12/2015 | Sprungman et al. |
| 2016/0128276 A1 | 5/2016 | Arnetoli |
| 2016/0183452 A1 | 6/2016 | Kullberg |
| 2017/0354089 A1* | 12/2017 | Kullberg ............ A01D 34/4161 |
| 2018/0116106 A1* | 5/2018 | Kullberg ............ A01D 34/4163 |

FOREIGN PATENT DOCUMENTS

| | | |
|---|---|---|
| EP | 0215416 A1 | 3/1987 |
| EP | 0271762 A1 | 6/1988 |
| EP | 0636307 A1 | 2/1995 |
| EP | 2517547 A1 | 10/2012 |
| TW | 473376 B | 1/2002 |
| WO | 2008053508 A2 | 5/2008 |
| WO | 2008053508 A3 | 8/2008 |
| WO | 2013138752 A1 | 9/2013 |
| WO | 2015144197 A1 | 10/2015 |
| WO | 2016107695 A1 | 7/2016 |

OTHER PUBLICATIONS

International Search Report and Written Opinion in International patent application No. PCT/EP2015/076998 dated Mar. 3, 2016.
International Preliminary Report on Patentability for International Application No. PCT/EP2014/055819 dated Sep. 27, 2016.
International Preliminary Report on Patentability for International Application No. PCT/EP2015/076998 dated Apr. 7, 2017.
Diatop & Sugihara, "Bump Feed Type NB5", accessed at http://www.diatop.eo.jp/english/files/nb5.pdf, accessed on Feb. 6, 2017, p. 1.
The definition of "register", accessed at https://www.merriam-webster.com/dictionary/register, accessed on Sep. 25, 2017, pp. 13.

* cited by examiner

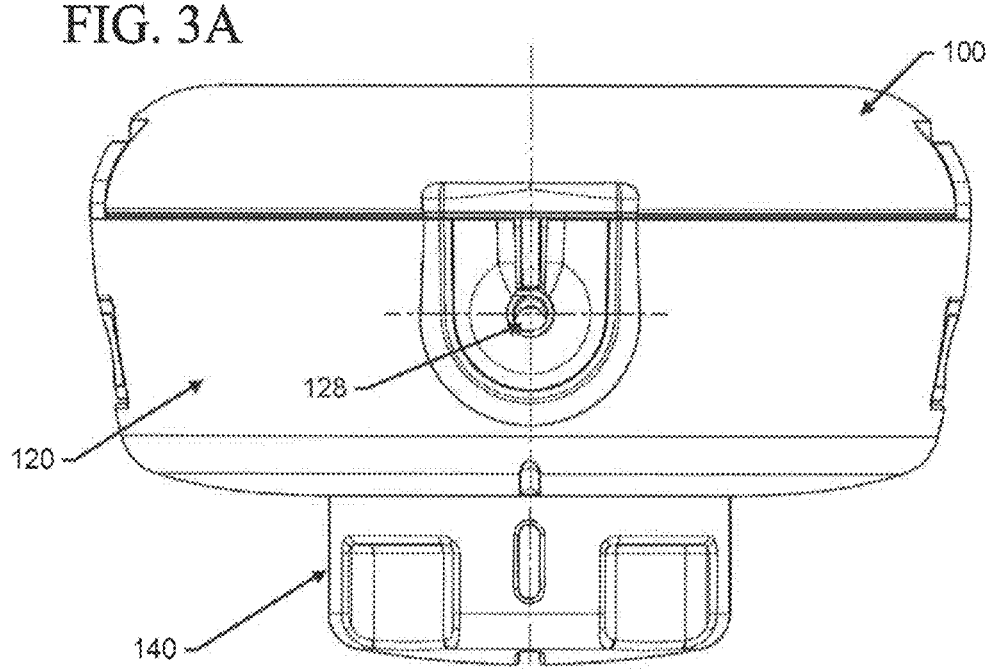
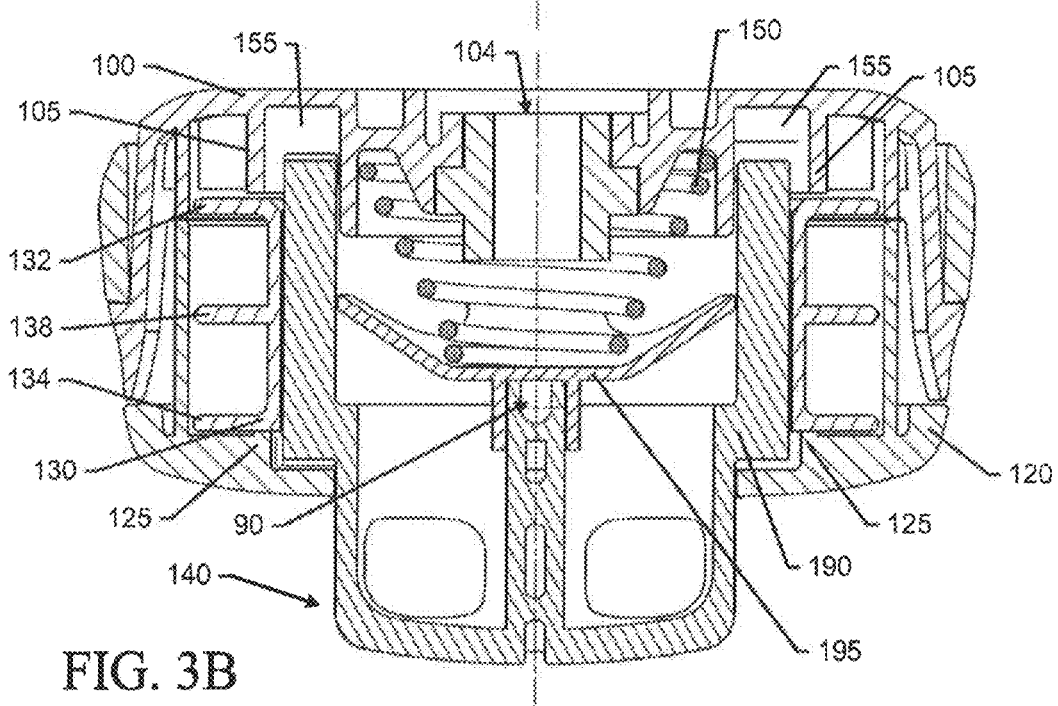

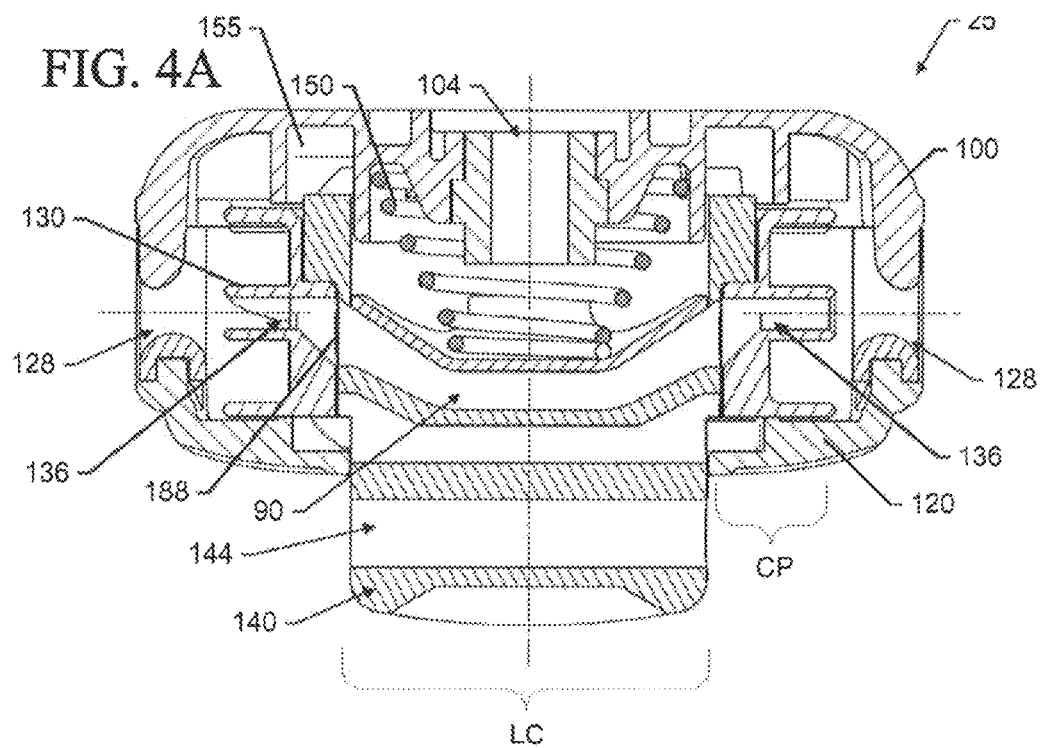
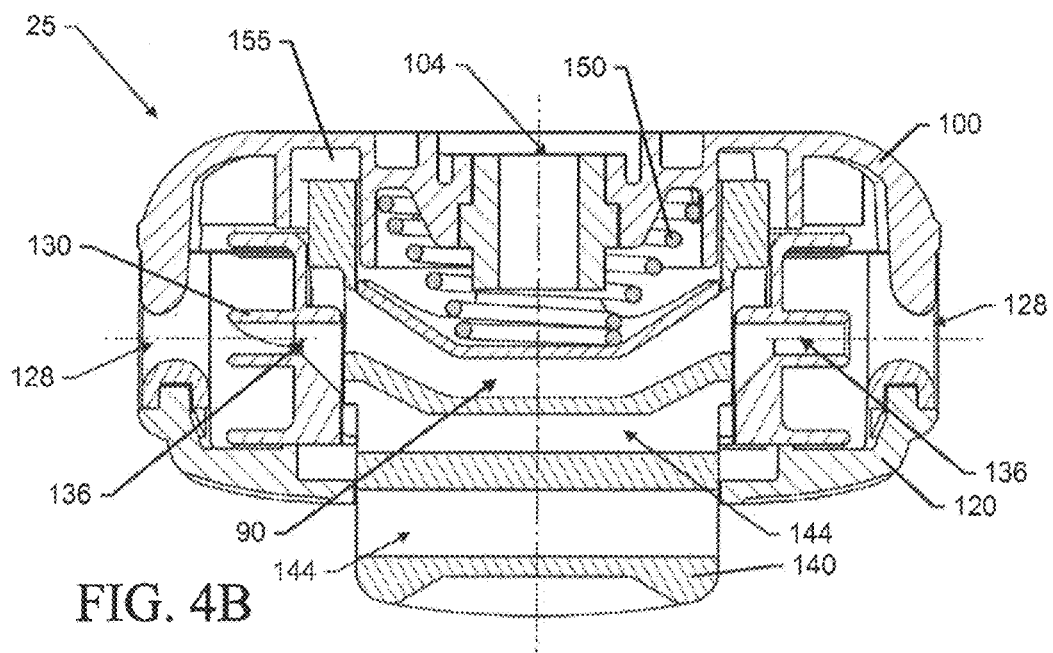

QUICK LOADING TRIMMER HEAD

TECHNICAL FIELD

Example embodiments generally relate to an outdoor power device that employ trimmer line and, more particularly, relate to a mechanism for providing relatively easy loading of trimmer line.

BACKGROUND

Handheld outdoor power devices such as trimmers, blowers, chainsaws, and/or the like, are often used to perform tasks relating to yard/grounds maintenance or even commercial resource harvesting activities that require them to be mobile. Although there are several options for powering such devices, including combustion engines, corded electric motors, or battery powered electric motors, each option may be viewed as having advantages in certain environments and for certain users.

Some trimming devices employ a trimmer line and are referred to as string trimmers. Alternatively, such devices may be known as edge trimmers, line trimmers, weed whips and/or the like. The trimmer line, which may be a monofilament line, is quite effective at cutting when rotated at high speed. Such a trimmer line is extended and held somewhat rigid by centrifugal forces while being rotated. In some cases, the trimmer line is wound upon a reel or spool and the trimmer line can be released by bumping the trimmer head on the ground during operation. However, it has been common for such devices to be somewhat difficult to load trimmer line into. Additionally, the method of releasing trimmer line by bumping the trimmer head on the ground during operation can lead to excessive wear of various portions of the trimmer head. Thus, operators may find it frustrating and/or difficult to replace the trimmer line. Accordingly, the user experience associated with employing such devices may suffer.

BRIEF SUMMARY OF SOME EXAMPLES

Some example embodiments may therefore provide a trimmer device that can accommodate a structure that is relatively quick and easy to load with trimmer line. The structure may provide a spool that is substantially fixed to prevent any substantial movement in the axial (or vertical) direction, but can move in the rotational direction responsive to operation of a power unit. As such, for example, the spool may be mated with a core that can be "bumped" to release line from the spool in a manner that permits the core to move in the axial (or vertical) direction, while the spool releases line but does not substantially move in the axial (or vertical direction). The structure may provide a line channel through the core that is much longer than the portion of the spool through which line is fed in the radial direction. A hand-held cutting device is comprising an elongated member graspable along a portion thereof by an operator. A trimmer head is disposed at one end of the elongated member and configured to be rotatable to perform a cutting function using trimmer line held at a portion of the trimmer head. A power unit operably coupled to the trimmer head to selectively cause rotation of the trimmer head via turning a shaft. The trimmer head comprises a line holding assembly to hold and selectively release the trimmer line. A housing is including a first housing portion and a second housing portion operably coupled to the first housing portion to house the line holding assembly. The line holding assembly includes a core having a first portion and a second portion. A spool is configured to hold the trimmer line that is operably coupled to the core. The second portion of the core extends outwardly from the housing and is non-rotatably fixed to the first portion of the core when the trimmer head is in an at-rest state, and is rotatable with respect to the first position of the core when the trimmer head is in an in-use state and rotating. The line holding assembly is configured such that rotational movement of the core causes corresponding movement of the spool, but movement of the core in an axial direction does not cause corresponding movement of the spool. The first housing portion is operably coupled to the shaft and turns responsive to operation of the power unit. The core comprises a line channel extending through the core in a radial direction to receive the trimmer line fed therethrough. A radial bearing operably disposed between the first portion of the core and the second portion of the core. The spool is non-rotatably fixed to the first portion of the core. The core is movable in the axial direction to release trimmer line from the spool, but the spool does not substantially move in the axial direction responsive to movement of the core in the axial direction. The first portion of the core comprises a locking projection that is radially movable between a first radially outward position and a second radially inward position. The second portion of the core defines a lock recess configured to receive the locking projection when it is disposed in its second position, thereby non-rotatably fixing the second portion of the core to the first portion of the core. The locking projection extends radially outward from a first portion of a body of a locking slide that is disposed opposite a second portion of body from which a counterweight extends radially outwardly. A spring that exerts a radially outward biasing force on locking projection. The locking projection is disposed on a first end of a locking lever that is pivotally secured to the first portion of the core. The locking lever comprises a counterweight disposed on a second end of the locking lever opposite the locking projection.

In one example embodiment, a trimmer head for a hand-held cutting device is provided. The trimmer head may include a first housing portion, a line holding assembly to hold and selectively release trimmer line, and a second housing portion operably coupled to the first housing portion to house the line holding assembly. The line holding assembly may include a spool configured to hold the trimmer line and a core operably coupled to the spool. The line holding assembly may be configured such that rotational movement of the core causes corresponding movement of the spool, but movement of the core in an axial direction does not cause corresponding movement of the spool.

In another example embodiment, a hand-held cutting device is provided. A hand-held cutting device is comprising an elongated member graspable along a portion thereof by an operator; a trimmer head is disposed at one end of the elongated member and configured to be rotatable to perform a cutting function using trimmer line held at a portion of the trimmer head. A power unit is operably coupled to the trimmer head to selectively cause rotation of the trimmer head via turning a shaft. The trimmer head comprises a line holding assembly to hold and selectively release the trimmer line. A housing is including a first housing portion and a second housing portion operably coupled to the first housing portion to house the line holding assembly. The line holding assembly includes a core having a first portion and a second portion. A radial bearing is operably disposed between the first portion of the core and the second portion of the core. A spool is configured to hold the trimmer line that is operably coupled to the core. The line holding assembly is configured such that rotational movement of the core causes corresponding movement of the spool, but movement of the core in an axial direction does not cause corresponding movement of the spool. The second portion of the core extends outwardly from the housing and is non-rotatably fixed to the first portion of the core when the trimmer head is in an at-rest state, and is rotatable with respect to the first position of the core when the trimmer head is in an in-use state and rotating. The core comprises a line channel extending through the core in a radial direction to receive the trimmer line fed there through. The spool is non-rotatably fixed to the first portion of the core. The first portion of the core comprises a locking projection that is radially movable between a first radially outward position and a second radially inward position. The second portion of the core defines a lock recess is configured to receive the locking projection when it is disposed in its second position, thereby non-rotatably fixing the second portion of the core to the first portion of the core. The locking projection extends radially outward from a first portion of a body of a locking slide that is disposed opposite a second portion of body from which a counterweight extends radially outwardly. A spring exerts a radially outward biasing force on locking projection. The locking projection is disposed on a first end of a locking lever that is pivotally secured to the first portion of the core. The locking lever comprises a counterweight disposed on a second end of the locking lever opposite the locking projection. The device may include an elongated member graspable along a portion thereof by an operator, a trimmer head disposed at one end of the elongated member and configured to be rotatable to perform a cutting function using trimmer line held at a portion of the trimmer head, and a power unit operably coupled to the trimmer head to selectively cause rotation of the trimmer head via turning a shaft. The trimmer head may include a first housing portion, a line holding assembly to hold and selectively release the trimmer line, and a second housing portion operably coupled to the first housing portion to house the line holding assembly. The line holding assembly may include a spool configured to hold the trimmer line and a core operably coupled to the spool. The line holding assembly may be configured such that rotational movement of the core causes corresponding movement of the spool, but movement of the core in an axial direction does not cause corresponding movement of the spool. As well, the line holding assembly may be configured such that a portion that comes into contact with the ground during operation is free to rotate with respect to the remainder of the line holding assembly.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

FIG. 3A illustrates a side view of the trimmer head in accordance with an example embodiment;

FIG. 3B illustrates a cross section view of the trimmer head in accordance with an example embodiment;

FIG. 4A illustrates a cross section view along a line that bisects a line channel with the trimmer head in a normal position in accordance with an example embodiment;

FIG. 4B illustrates the cross section view of FIG. 4A with the trimmer head in a "bumped" condition in accordance with an example embodiment;

DETAILED DESCRIPTION

Figure 1:
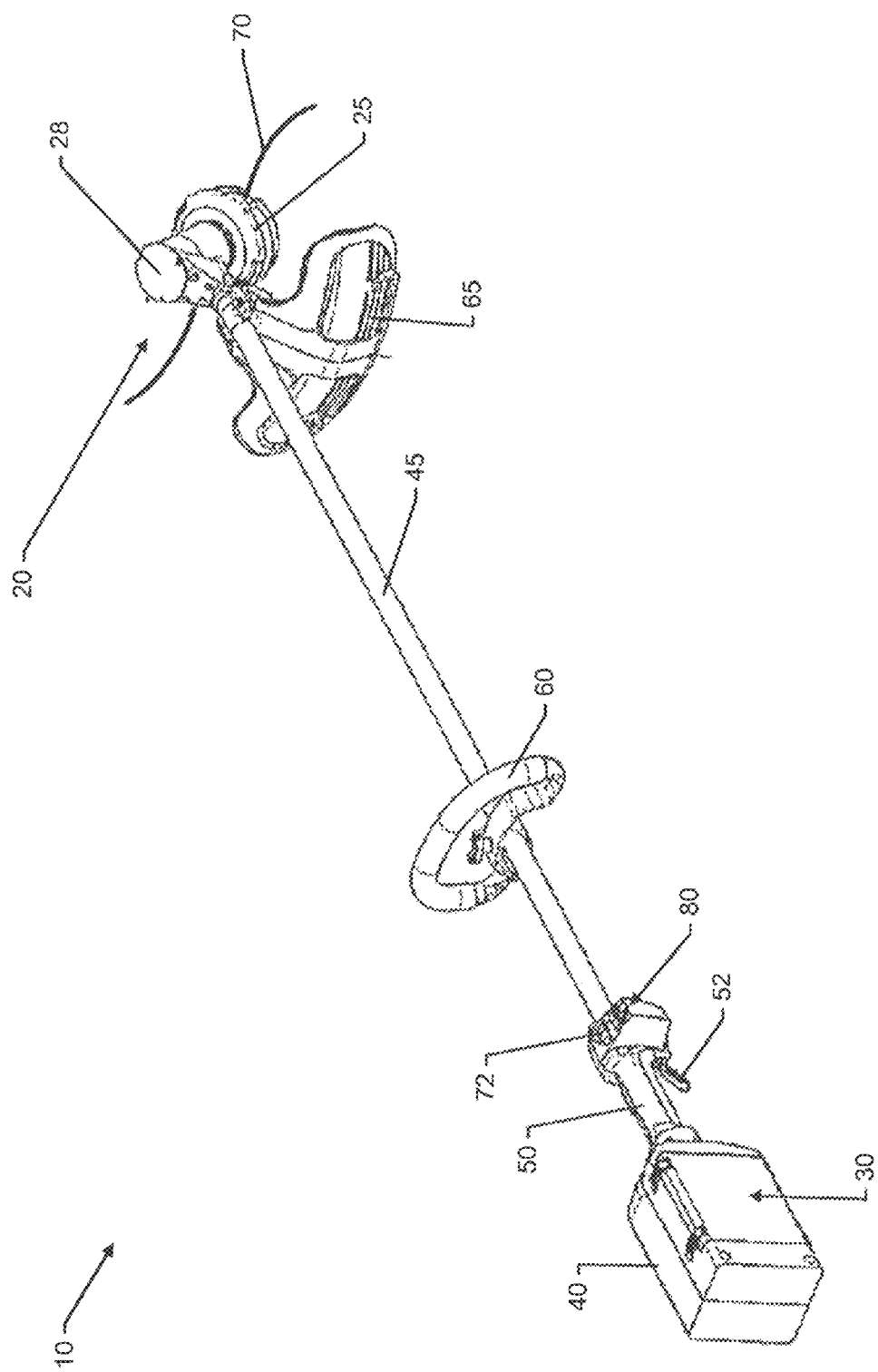
FIG. 1 illustrates a perspective view of an electric powered trimmer that may be configured in accordance with an example embodiment.

Some example embodiments now will be described more fully hereinafter with reference to the accompanying drawings, in which some, but not all example embodiments are shown. Indeed, the examples described and pictured herein should not be construed as being limiting as to the scope, applicability or configuration of the present disclosure. Rather, these example embodiments are provided so that this disclosure will satisfy applicable legal requirements. Like reference numerals refer to like elements throughout. Furthermore, as used herein, the term "or" is to be interpreted as a logical operator that results in true whenever one or more of its operands are true. As used herein, operable coupling should be understood to relate to direct or indirect connection that, in either case, enables functional interconnection of components that are operably coupled to each other. One of skill in the art will appreciate the normal position in which devices of example embodiments are held for operation and that the working assembly represents the front of such devices. All other directional references should be understood in this general context.

Some example embodiments described herein provide a line holding assembly that can be easily molded and assembled, and that allows an operator to quickly and easily load trimmer line onto a trimmer head. In particular, some example embodiments provide a two-piece line holding assembly in which the spool and core are separate pieces to permit easy construction. In some cases, to further increase the ease of manufacturing, even the core may be split into two pieces. The parts may then be assembled, and the resultant assembly may permit movement of the core in the axial direction (e.g., to let out more line), but may prevent movement of the spool in the axial direction. Meanwhile, the core and spool may move together for rotational movements.

Referring to the drawings, FIG. 1 shows an electric powered trimmer 10 that may be configured in accordance with an example embodiment. However, it should be appreciated that the trimmer 10 is merely one example of an electric powered, outdoor power device that may be configured in accordance with an example embodiment. However, example embodiments could alternatively be employed in connection with corded versions of various electric powered, outdoor power devices. Moreover, in some cases, example embodiments could also be practiced in connection with combustion engines that are configured to turn an output shaft. Thus, although an example embodiment will be described hereinafter with specific reference to the battery powered trimmer 10 of FIG. 1, the applicability of alternative embodiments relative to other types of devices should be well understood.

As shown in FIG. 1, the trimmer 10 may include a working implement or working assembly 20, which in this example includes a rotatable trimmer head 25. The working assembly 20 may further include a motor (e.g., an electric motor) disposed in a housing 28 of the working assembly 20. However, for gas powered embodiments and for some electrically powered embodiments, the motor is often disposed remotely with respect to the trimmer head 25, and power is transferred to the trimmer head 25 via couplings provided in the housing 28. The motor of the trimmer 10 may be powered, according to this example, by a battery pack 30. The battery pack 30 is received into a battery compartment of the trimmer 10. It should be appreciated that the battery pack 30 and/or motor of this example form a power unit that can turn the working assembly 20. However, in other examples, the power unit may include a combustion engine or other suitable power source.

The battery compartment may be a recess or cavity formed in a casing 40 of the trimmer 10 disposed at one end of an elongated member 45 that may further include the working assembly 20 at an opposite end thereof. The elongated member 45 may be a hollow tube, pipe, rod or other such member that may be straight or curved in different embodiments. The elongated member 45 may provide operable communication between the working assembly 20 and the battery pack 30 so that the battery pack 30 can power the working assembly 20. In some embodiments, the casing 40 may be formed from one or more plastic or other rigid components that may be molded to have a desired shape.

The casing 40 may substantially enclose the battery compartment, control circuitry and/or other components associated with powering and/or controlling the operation of the trimmer 10. However, it should also be appreciated that the battery pack of some alternative embodiments may be housed within a backpack that may be worn on the operator's back. In such an example, the battery pack may be connected to the trimmer 10 via a cord or other adaptor.

In an example embodiment, the trimmer 10 may include a rear handle 50 and a front handle 60. The rear handle 50 may be disposed in-line with the elongated member 45 proximate to the casing 40, while the front handle 60 may be disposed between the casing 40 and the working assembly 20 at an intermediate portion of the elongated member 45. An operator of the trimmer 10 may use one hand to hold the front handle 60 and the other hand to hold the rear handle 50 while operating the trimmer 10. In some embodiments, the rear handle 50 may include a trigger 52 or other control mechanism for engaging operation of the motor to power the working assembly 20.

Although FIG. 1 shows the front handle 60 being positioned forward of the rear handle 50 along the elongated member 45, it should also be appreciated that other arrangements for holding and operating the trimmer 10 may be provided. For example, in some cases, a "handlebar" embodiment may be provided in which the front and rear handles 60/50 are replaced by a single handle assembly attached to the elongated member 45 where both handles on the handle assembly are substantially equidistant from the working assembly 20 and disposed spaced apart from the elongated member 45 on opposites sides thereof on a handlebar assembly. Other arrangements are also possible.

The trimmer 10 may further employ a trim shield 65 that is configured to prevent cut materials and/or debris from coming back at the operator. The operator may actuate the trigger 52 to power the working assembly and turn the trimmer head 25. The trimmer head 25 may include trimmer line 70 that may extend outwardly (e.g., in a radial direction relative to a shaft forming an axis about which the trimmer head 25 rotates) from the trimmer head 25 to cut vegetation encountered thereby. The trim shield 65 may employ at least one knife element (not shown) to cut the trimmer line 70 to a length slightly less than the distance from the external periphery of the trimmer head 25 to the internal periphery of the trim shield 65 responsive to rotation of the trimmer head 25.

In an example embodiment, the motor may be a DC motor or a brushless DC motor (BLDC) that is powered by the battery pack 30. The motor may be configured to turn in either the clockwise or counterclockwise direction when a power switch 72 is powered on. In the example of FIG. 1, the power switch 72 may be provided at a control panel or control assembly 80 that may be positioned proximate to the rear handle 50. However, the control assembly 80 could be positioned at any of a number of other locations on the trimmer 10 in alternative embodiments. Moreover, it should be appreciated that gasoline powered embodiments may replace the trigger 52 with a throttle and may replace the battery pack with a gasoline engine. The general structure, however, of even such gasoline powered embodiments may generally be similar and, as indicated above, the power unit may therefore be electric or gas powered.

The rotation of the trimmer head 25 may cause the trimmer line 70 (which may be monofilament line) to stiffen extensively based on centrifugal forces applied to the trimmer line 70 during rotation. The faster the rotation, the stiffer the trimmer line 70 generally becomes. The trimmer line 70 can therefore make a good cutting tool for the cutting or trimming of most vegetation that is not substantially woody. However, it is typically inevitable that the trimmer line 70 will be worn during use. The wearing forces acting on the trimmer line 70 may cause the line to break, abrade or otherwise shorten in length over time. To re-extend the trimmer line 70 to full length, the trimmer head 25 may be "bumped" on the ground to release more trimmer line 70 (and cut it to length, if appropriate).

To provide sufficient additional trimmer line 70 to allow the "bump" operation to release line, the trimmer head 25 may be provided with a trimmer line spool upon which extra trimmer line 70 may be wound. However, even this spool would eventually run out of trimmer line 70 over time and need replenishment. In the past, the winding of more trimmer line 70 onto the spool has required some level of disassembly of the trimmer head 25. This disassembly and winding of trimmer line 70 can be cumbersome, and may be difficult to accomplish in a quick and easy manner. Accordingly, some example embodiments have been provided to improve the capability of the operator to easily and quickly replenish trimmer line 70 onto the trimmer head 25.

Figure 2A:
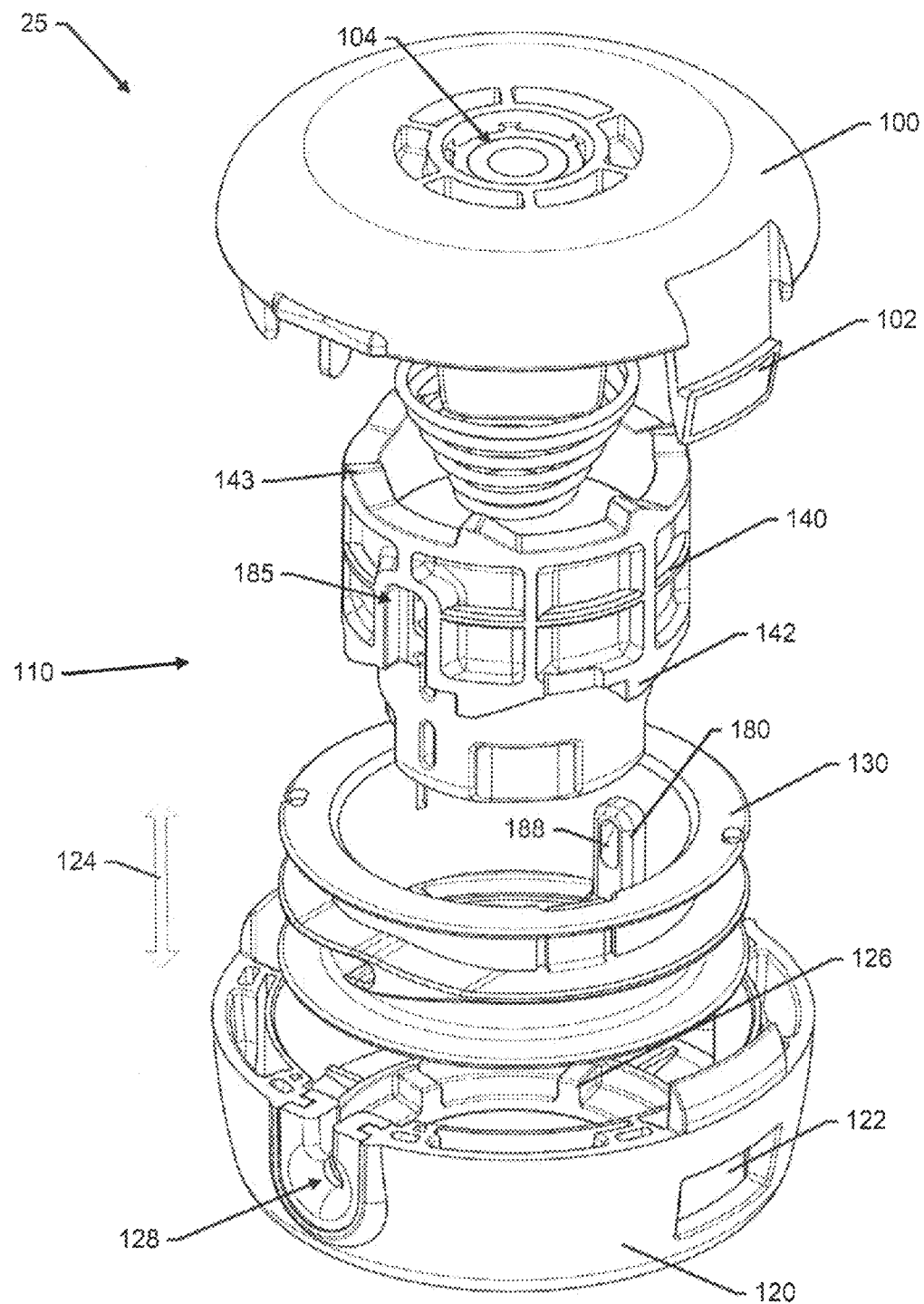
FIG. 2A illustrates an exploded perspective view of a trimmer head configured in accordance with an example embodiment from above.
Figure 2B:
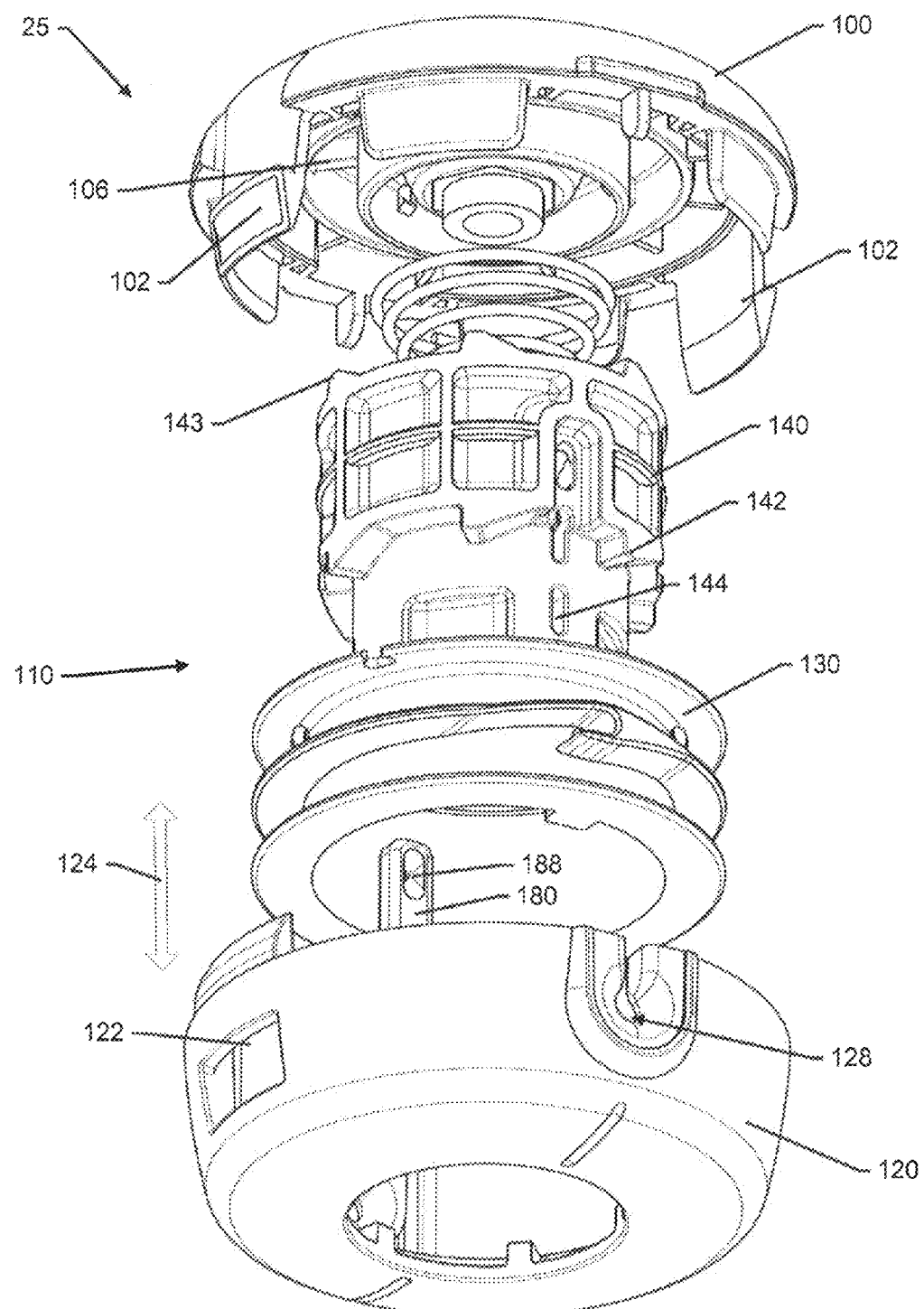
FIG. 2B illustrates an exploded perspective view of a trimmer head configured in accordance with an example embodiment from below.
Figure 5:
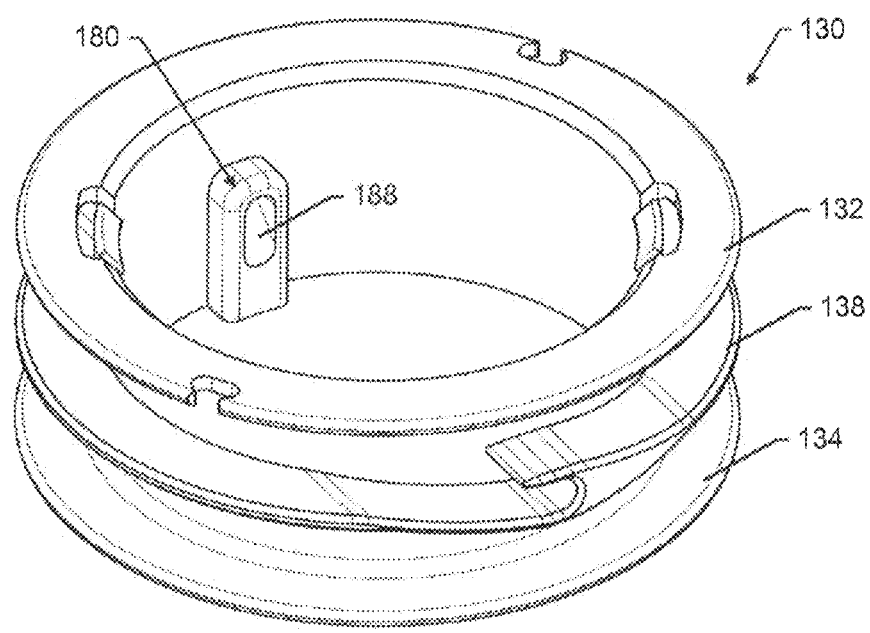
FIG. 5 illustrates a perspective view of a spool in accordance with an example embodiment.
Figure 6:
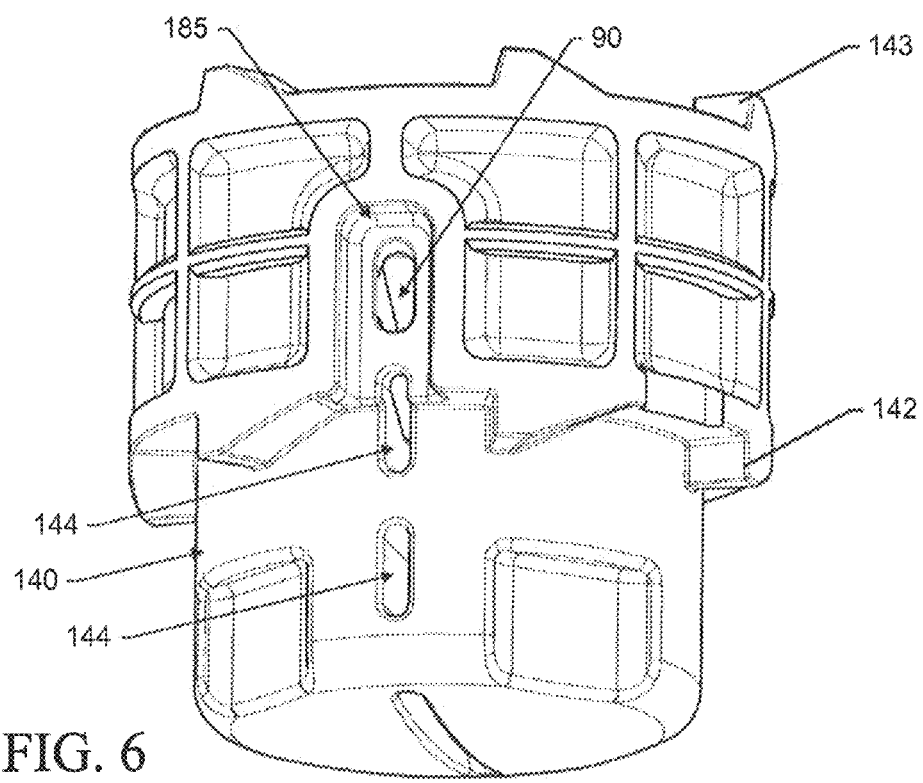
FIG. 6 illustrates a perspective view of a core in accordance with an example embodiment.

FIG. 2, which includes FIGS. 2A and 2B illustrates an exploded perspective view of the trimmer head 25 of an example embodiment from above (FIG. 2A) and below (FIG. 2B) perspectives. FIG. 3, which includes FIGS. 3A and 3B, illustrates a side view and cross section view of the trimmer head 25 of an example embodiment. The orientation of the trimmer head 25 in FIGS. 3A and 3B is such that the observer is looking into a line channel 90 through which trimmer line is passed prior to being wound onto a spool 130 of the device. FIG. 4, which includes FIGS. 4A and 4B, illustrates cross section views taking along a line that bisects the line channel 90. FIG. 4A shows the trimmer head 25 in a normal position and FIG. 4B shows the trimmer head 25 in a "bumped" condition. FIG. 5 illustrates a perspective view of the spool 130 in accordance with an example embodiment, and FIG. 6 illustrates a perspective view of a core 140 in accordance with an example embodiment.

As shown in FIGS. 2-6, the trimmer head 25 may include a first housing portion 100, a line holding assembly 110 to hold and selectively release trimmer line (not shown in FIG. 2-6), and a second housing portion 120. The second housing portion 120 may be operably coupled to the first housing portion 100 to house the line holding assembly 110. In an example embodiment, the first and second housing portions 100 and 120 may be snap fit together, fastened with one or more screws or other fastening members, and/or latched together. In the example of FIG. 2, the first housing portion 100 may include tabs 102 that snap fit into corresponding tab receivers 122 of the second housing portion 120. Generally speaking, the first housing portion 100 may be disposed on top of the second housing portion 120, which may be disposed on the bottom of the assembly. The terms top and bottom in this context are relative to the normal way the trimmer 10 is held with the bottom being closest to the ground.

The line holding assembly may include the spool 130 configured to hold the trimmer line and the core 140 operably coupled to the spool 130 such that rotational movement of the core 140 causes corresponding movement of the spool 130, but movement of the core in an axial direction (indicated by arrow 124) does not cause corresponding movement of the spool 130. The first housing 100 may include a coupling portion 104 that may be operably coupled to a shaft that is turned by the power unit. However, in some embodiments, the shaft may be operably coupled to the core 140. In either case, the power unit may ultimately cause the core 140 to turn and, relative to rotational movement, the core 140 may then turn the spool 130 as well.

A biasing element (e.g., spring 150) may be provided between the first housing portion 100 and the core 140 to bias the core 140 downward in the axial direction. When a "bump" operation is conducted by tapping the core 140 on the ground, the core 140 may move upward against the force of the spring 150 to enable the centrifugal force on the trimmer line during the rotation of the spool 130 relative to the second housing portion 120 to cause the spool 130 to release trimmer line. In particular, the second housing portion 120 may include one or more detents 126 that may lie in registration with one or more corresponding slide projections 142 on the core 140. Meanwhile, the first housing portion 100 may include similar detents 106 that may lie in registration with slide projections 143 disposed facing upwardly from the external periphery of the core 140. However, it should be appreciated that in alternative structures, the locations of the detents (106 and 126) and slide projections (142 and 143) could be reversed. The slide projections 142 may typically engage the detents 126 to prevent movement of the core 140 relative to the second housing portion 120 while the spring 150 pushes the slide projections 142 and the detents 126 into contact with each other. When the operator taps the core 140 on the ground, the force of the spring 150 may be overcome momentarily to enable the slide projections 142 to disengage the detents 126 and rotate the core 140 (and spool 130) relative to the second housing portion 120 to allow trimmer line to be released from the spool 130 through orifices 128 on the second housing portion 120. Meanwhile, the slide projections 143 may catch the next set of detents 106 to limit the amount of relative motion between the housings and the core 140.

As can be seen in FIG. 3B, the first housing portion 100 may include spool stays 105 disposed above the spool 130. Similarly, the second housing portion 120 may include spool stays 125 to combine with the spool stays 105 on the first housing portion 100 to limit movement of the spool 130 in the axial direction. Meanwhile, the core 140 may fit inside the spool 130 and have room to move in the axial direction within a core channel 155 that is shown to have room at the top to accommodate upward movement of the core 140 in the axial direction.

Referring specifically to FIGS. 4A and 4B, the line channel 90 may extend through the core 140 in a radial direction to receive the trimmer line fed therethrough. Although it should be appreciated that in some embodiments, the line channel 90 may be part of the spool 130. Regardless, in some cases, the line channel 90 may include at least one bend along a length thereof. The bend may extend in the axial direction away from the spring 150. In some cases, the line channel 90 may have a same width in the axial direction over an entirety of the line channel 90. However, in some embodiments, the line channel 90 has a first width in the axial direction over a mid portion of the line channel 90, and the line channel may expand to a second width in the axial direction proximate to each of the opposing ends of the line channel 90. As shown in FIG. 4, the core 140 may have additional hollow channels 144 that serve to reduce the overall weight of the core 140. When the embodiment of FIG. 4A is "bumped", the core channel 155 enables the core 140 to move upward to reduce the free volume at the top of the core channel 155 as shown in FIG. 4B.

In some embodiments, the spool 130 may include a first flange 132 and a second flange 134 that extend in respective planes that are substantially parallel to each other and substantially perpendicular to the axial direction. The trimmer line extending out from opposing ends of the line channel 90 may be fed through channel portions 136 disposed to pass through the spool 130 in the radial direction. The channel portions 136 may terminate at the internal periphery of the spool 130 at respective line orifices 188. The line orifices 188 may be aligned in registration with the ends of the line channel 90. Trimmer line fed through the line channel 90, the line orifices 188 and the channel portions 136 may then be wound onto the spool between the first and second flanges 132 and 134 responsive to rotation of the core 140 about the axis of the core by the operator. For example, the core 140 may have grip portions to allow the operator to grasp the grip portions and manually turn the core 140 (and therefore also turn the spool 130) to wind trimmer line onto the spool 130. The spool 130 of some embodiments may also include a third flange 138 disposed between the first and second flanges 132 and 134 to divide the spool 130 into a top line receiving portion and a bottom line receiving portion. In such an example, the top line receiving portion may receive the trimmer line exiting one end of the line channel 90 and the bottom line receiving portion may receive trimmer line exiting the other end of the line channel 90.

As mentioned above, the core 140 may be movable in the axial direction to release trimmer line from the spool 130, but the spool 130 does not substantially move in the axial direction when the core 140 moves in the axial direction. Thus, although the spool 130 is affixed to the core 140 to move in registration therewith responsive to rotational movement of the core 140, the spool 130 is enabled to slide over the surface of the core 140 when the core 140 moves in the axial direction. The channel portions 136 of the spool 130 that are proximate to the ends of the line channel 90 (i.e., at location of the line orifices 188) may be wider to ensure that some portion of the channel portions 136 stays in alignment with the line channel 90 even when the core 140 moves axially (e.g., responsive to a bump operation).

To maintain the spool 130 and core 140 in registration with each other for rotational movement, while still permitting relative motion between the two in the axial direction, the spool 130 may be annularly shaped to define an inner periphery that is slightly larger than the external periphery of the core 140 (which may be generally cylindrical in shape at the area of overlap with the spool 130). The spool 130 may therefore slidably engage the outer periphery of a portion of the core 140 to permit relative movement of the core 140 in the axial direction. However, it should be appreciated that the spool 130 and the core 140 could alternatively have other shapes that are substantially matched to permit slidable engagement in the axial direction. For example, hexagonal, octagonal or other shapes may be employed. In an example embodiment, the inner periphery of the spool 130 may be provided with a vertical protrusion 180. Meanwhile, the external periphery of the core 140 may be provided with a vertical channel 185 that is slightly larger in size (but substantially similarly shaped) compared to the vertical protrusion 180. When the core 140 is bumped to move in the axial direction, the vertical protrusion 180 may be configured to ride in the vertical channel 185.

In some embodiments, a length of the line channel LC may be longer than a combined length of extension of the channel portions 136 on each respective opposing side of the spool. Thus, the length of each channel portion 136 may be a length CP and LC may be greater than 2×CP.

In some embodiments, the core 140, the spool 130, and/or the first and second housing portions 100 and 120 may be made of hard plastic or some other rigid material. Thus, in some cases, the core 140, the spool 130, and/or the first and second housing portions 100 and 120 may be molded components. However, to facilitate easier formation of the line channel 90, the core may sometimes be formed in two parts. Thus, for example, a core base 190 may be molded as one piece and a core insert 195 may be separately molded to fit into the core base 190 to define the line channel 90. In particular, the core insert 195 may form top portion of the line channel 90 and may be separable from the core base 190, which may form the bottom portion of the line channel 90 as shown in FIG. 3B.

Figure 7:
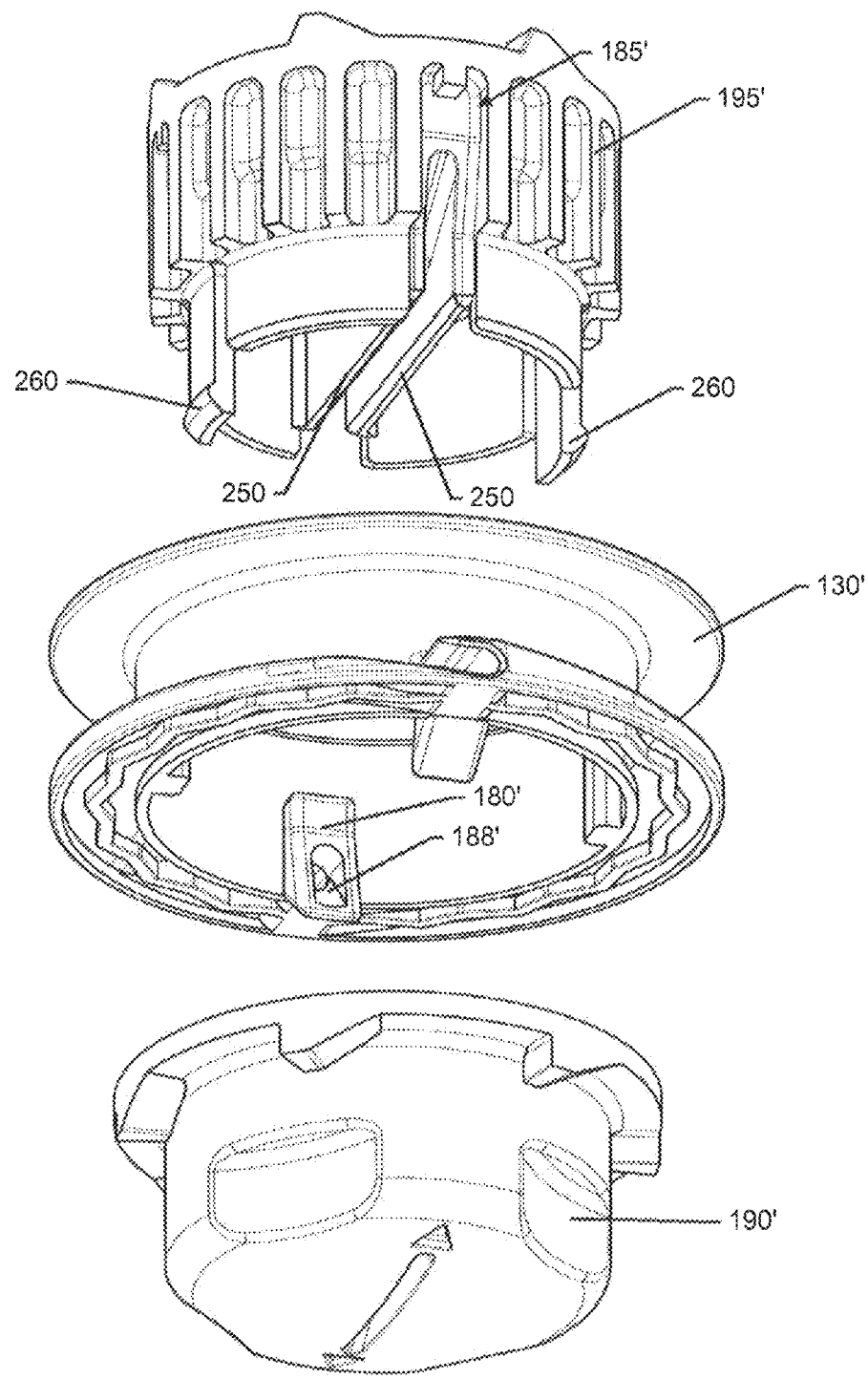
FIG. 7 illustrates an exploded perspective view of an alternative line holding assembly from a bottom perspective in accordance with an example embodiment.
Figure 8:
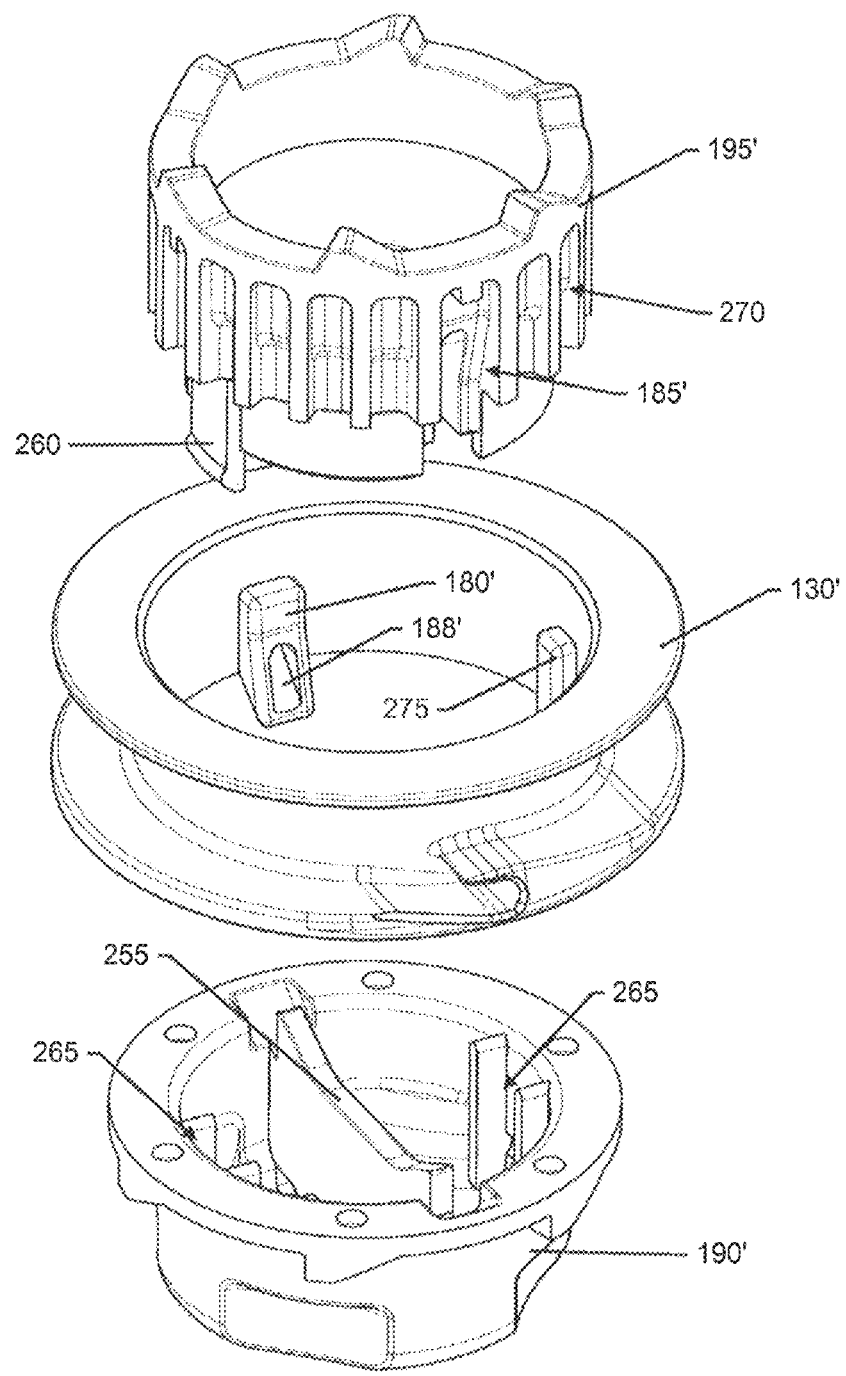
FIG. 8 illustrates an exploded perspective view of the alternative line holding assembly from a top perspective in accordance with an example embodiment.
Figure 9:
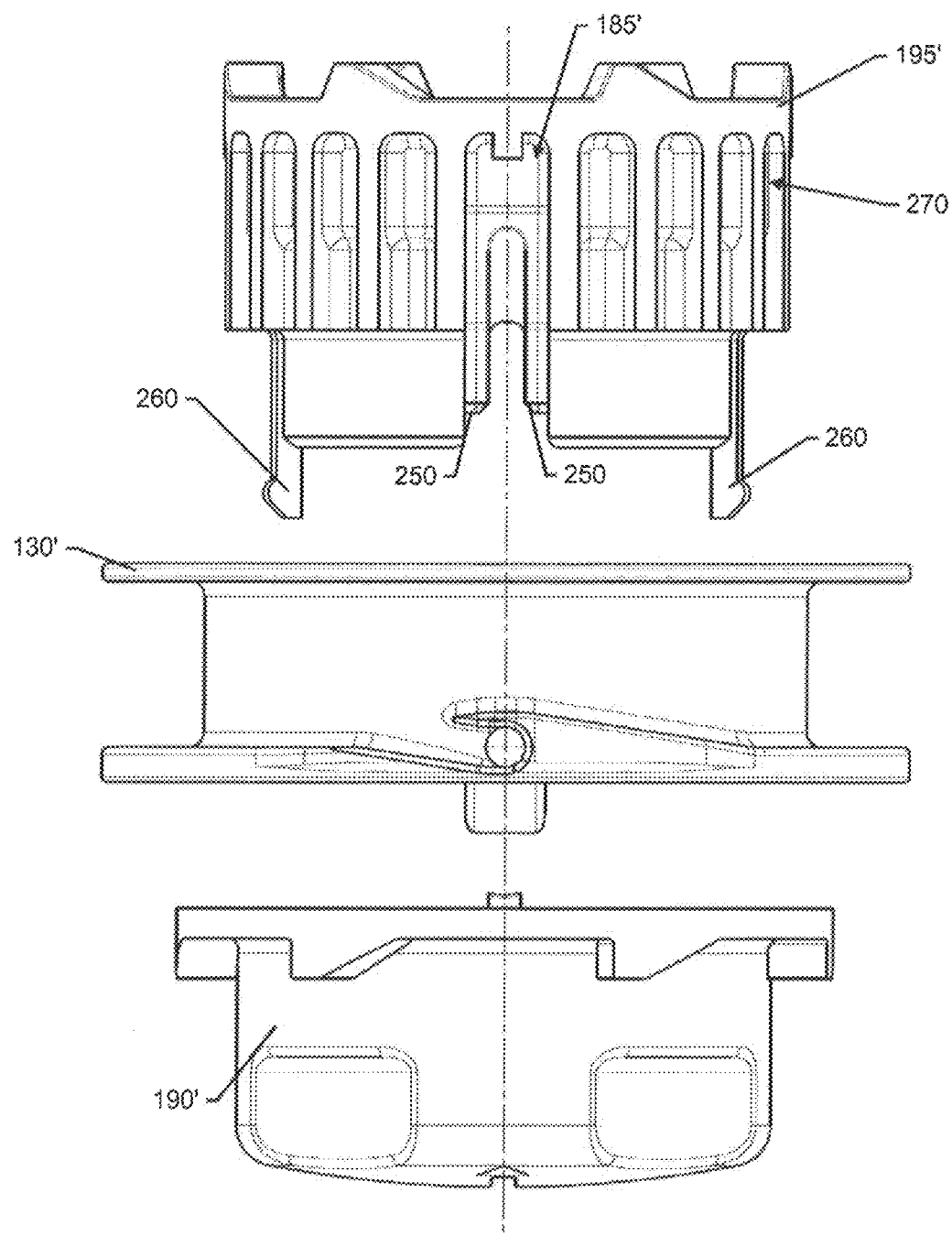
FIG. 9 illustrates an exploded side view of the alternative line holding assembly in accordance with an example embodiment.
Figure 10:
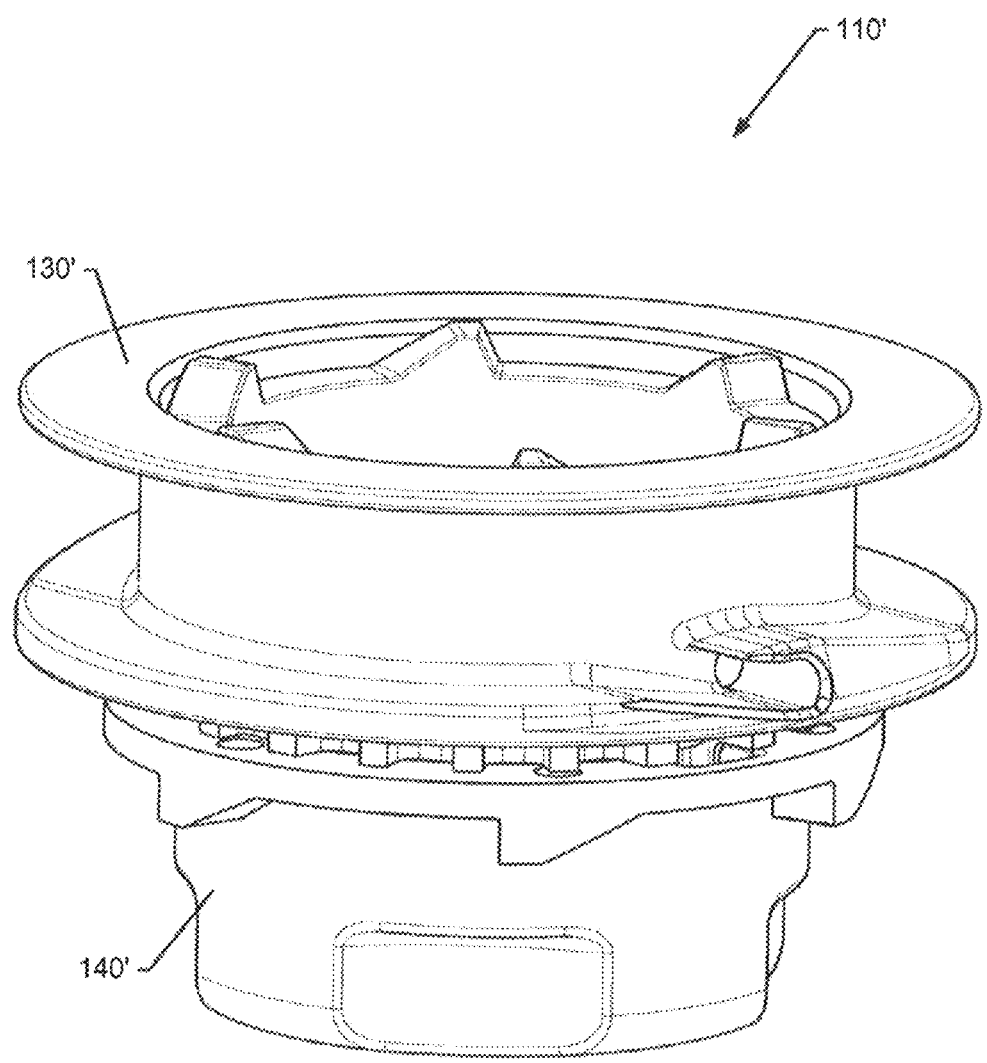
FIG. 10 illustrates a perspective view of the alternative line holding assembly in an assembled state in accordance with an example embodiment.
Figure 11:
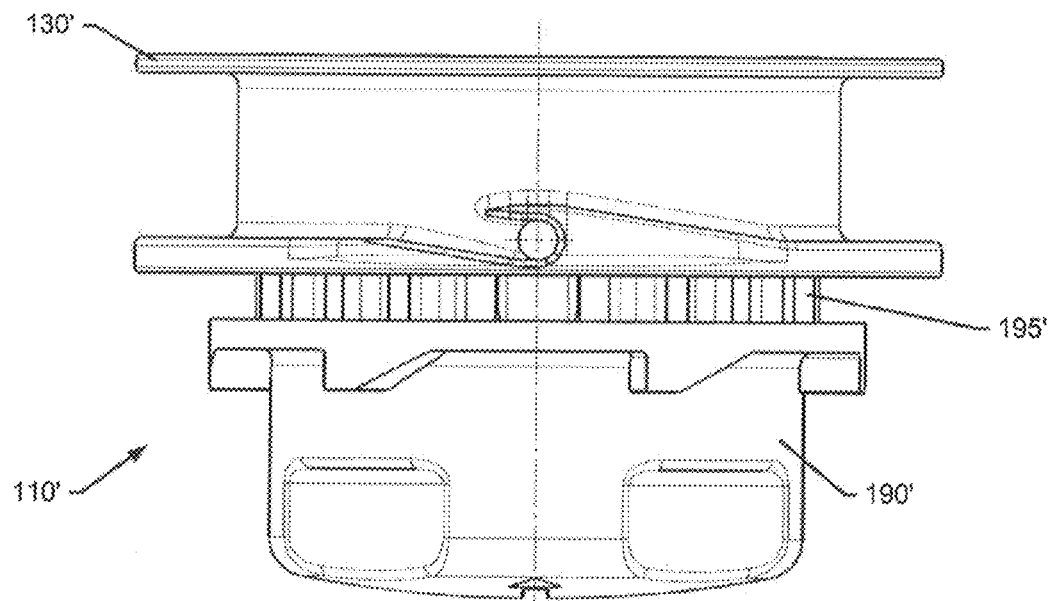
FIG. 11 illustrates a side view of the alternative line holding assembly in an assembled state in accordance with an example embodiment.
Figure 12:
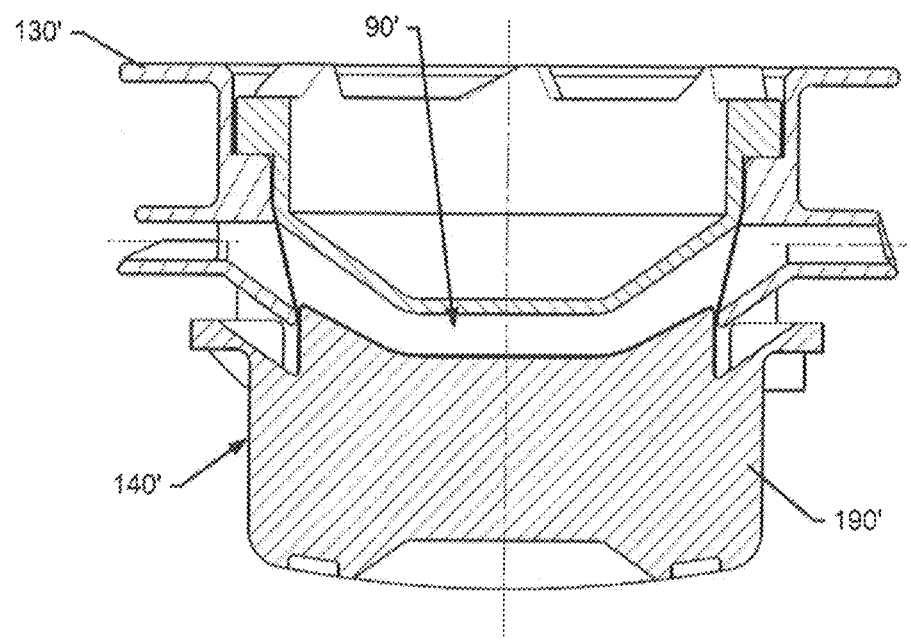
FIG. 12 illustrates a cross section view of the alternative line holding assembly according to an example embodiment.

The specific structures shown in FIGS. 2-6 illustrate one example embodiment. However, other specific structures may be used to embody the same inventive concepts. In this regard, FIGS. 7-12 illustrate an alternative core and/or spool structure that could be employed in some embodiments. As such, the example of FIGS. 7-12 represents an alternative line holding assembly 110'. FIGS. 7 and 8 represent exploded perspective views of the line holding assembly 110' from opposing perspectives and FIG. 9 illustrates an exploded side view of the line holding assembly 110'. FIG. 10 illustrates a perspective view of the line holding assembly 110' in an assembled state, and FIGS. 11 and 12 illustrate an assembled state, side view and cross section view, respectively.

The line holding assembly 110' may generally be inserted into the first housing portion 100 and second housing portion 120 described above, and the operation of the line holding assembly 110' may be substantially similar to the operations described above. However, the line holding assembly 110' of this example may include a two-piece core 140'. If desired, the line holding assembly 110' may employ a spool 130' having only two flanges (and therefore only one line receiving portion). The spool 130' may still include a line orifice 188' formed in a vertical protrusion 180' on the internal periphery of the spool 130' Moreover, the vertical protrusion 180' may be configured to ride in a vertical channel 185' on a portion of the core 140'.

The line holding assembly 110' may also include a line channel 90'. However, the line channel 90' may be formed by a top part (i.e., core insert 195') that defines sidewalls 250 and a top for the line channel 90' and a bottom part (i.e., core base 190') that defines a base 255 of the line channel 90'. The core insert 195' may further include protrusions 260 that may be configured to snap into corresponding receivers 265 disposed in the core base 190'. In some cases, the external periphery of the core insert 195' may further include one or more stabilizer channels 270 that may be configured to mate with corresponding one or more stabilizer protrusions 275 at an internal periphery of the spool 130'. The mating of the stabilizer channels and protrusions may prevent the spool from wobbling relative to the core 140'.

Figure 13:
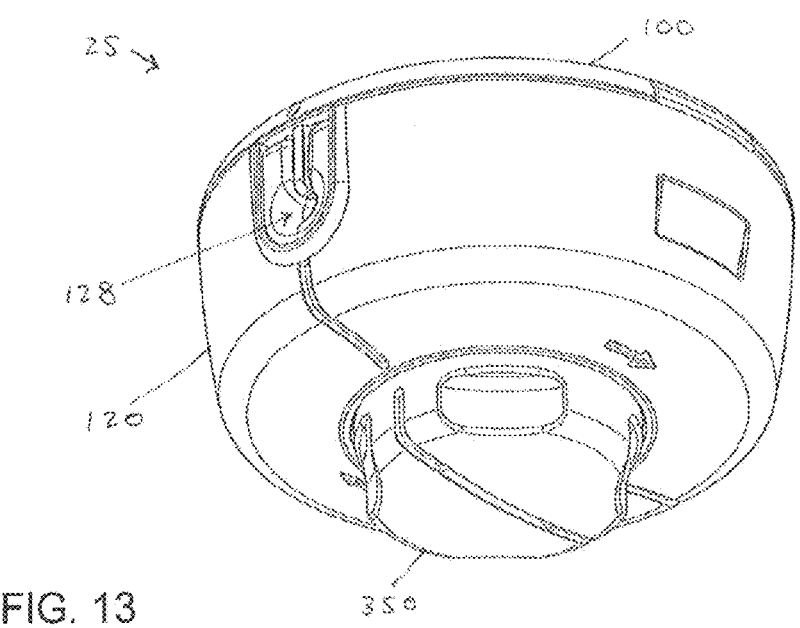
FIG. 13 illustrates a bottom perspective view of a trimmer head including an alternative line holding assembly in accordance with an example embodiment.
Figure 14:
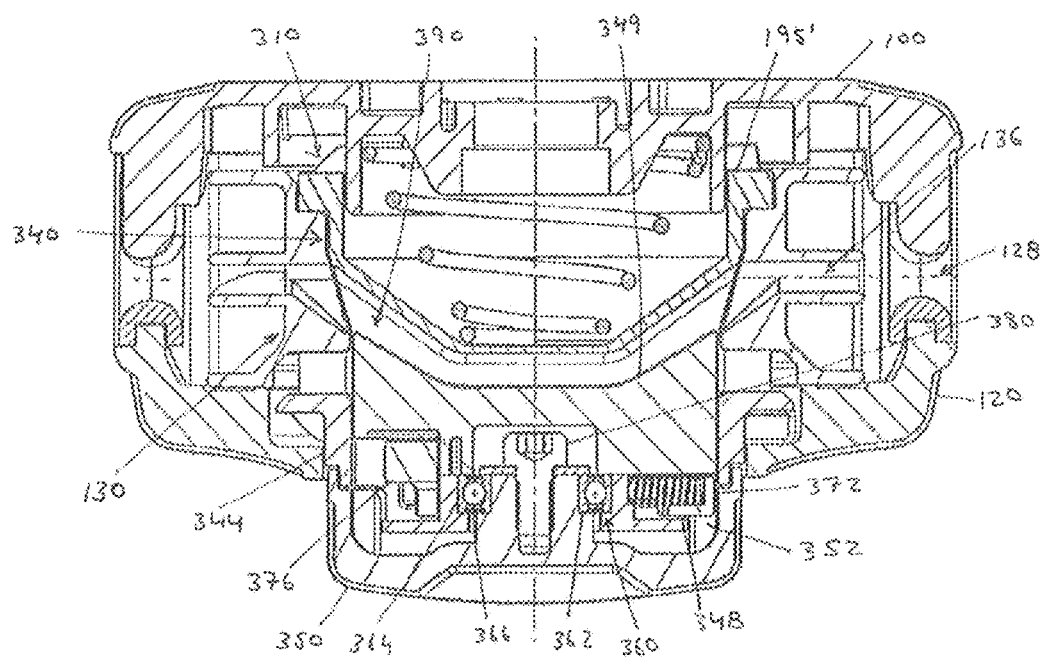
FIG. 14 illustrates a cross section view of the trimmer head in FIG. 13.
Figure 15:
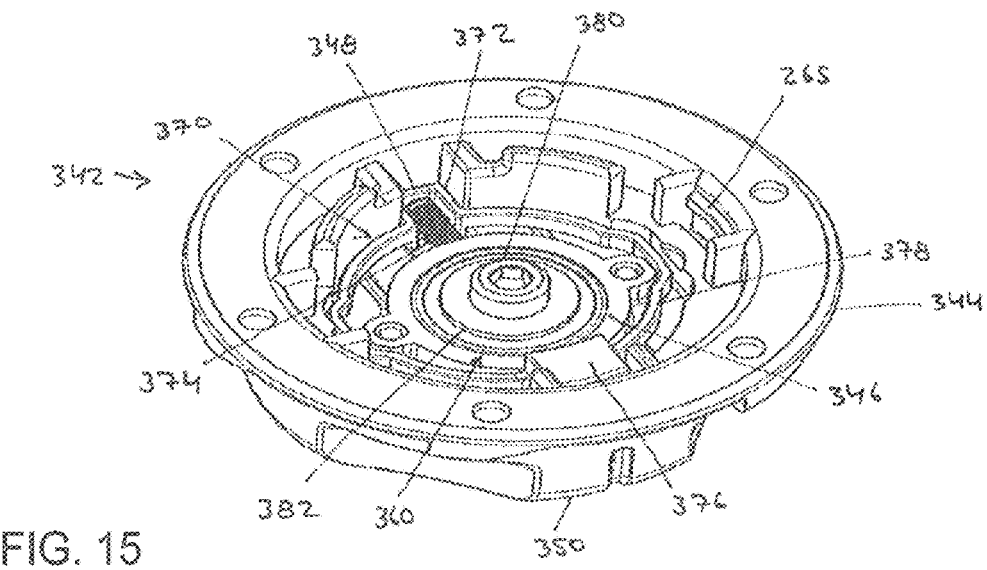
FIG. 15 illustrates an assembled perspective view of a portion of the alternative line holding assembly in accordance with an example embodiment.
Figure 16:
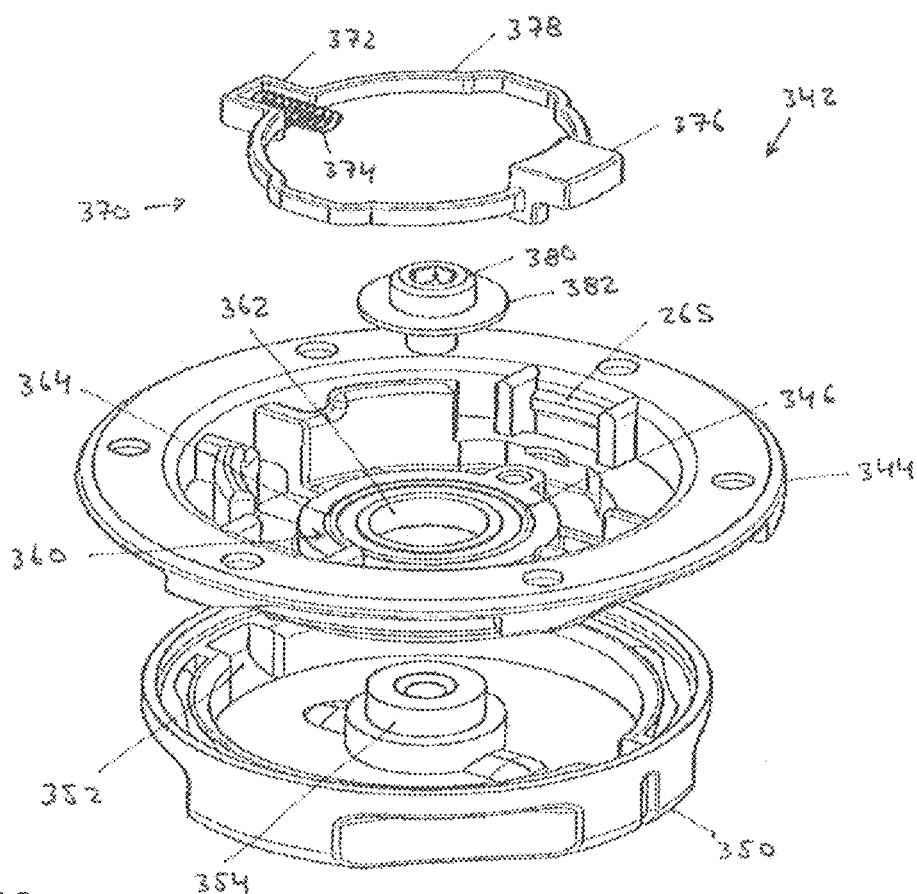
FIG. 16 illustrates an exploded perspective view of the portion of the alternative line holding assembly shown in FIG. 16.

The specific structures shown in FIGS. 2 through 12 illustrate two example embodiments. In this regard, FIGS. 13 through 16 illustrate an alternative core and/or spool structure that could be employed in some embodiment. As such, the example of FIGS. 13 through 16 represents an alternative line holding assembly 310. FIG. 13 illustrates a perspective view of a trimmer head including the alternative line holding assembly 310, and FIG. 14 is a cross-sectional view of the trimmer head and line holding assembly 310 shown in FIG. 13. FIG. 15 illustrates a top perspective view of the assembled core base 342 of a core 340 of the line holder assembly 310, and FIG. 16 illustrates an exploded perspective view of the core base 342 as shown in FIG. 15.

The line holding assembly 310 may generally be inserted into the first housing portion 100 and second housing portion 120 described above, and the operation of the line holding assembly 310 may be substantially similar to the operations described above. However, the line holding assembly 310 of this example may include a multi-piece core including a core base 342 and a core insert 195', the core insert 195' being similar to that previously discussed with regard to the embodiment shown in FIGS. 7 through 12. As shown, the line holding assembly 310 employs a spool 130 as previously discussed with regard to the embodiment of FIGS. 2 through 6, but in alternate embodiments may include a spool 130' as previously discussed with regard to the embodiment shown in FIGS. 7 through 12.

The line holding assembly 310 also includes a line channel 390. The line channel 390 may be formed by core insert 195' that defines the side walls and top of the line channel 390 and a channel base 349 of the line channel 390 that is secured to the core base 342 by fasteners (not shown) and extends upwardly therefrom. As best seen in FIGS. 15 and 16, the core base 342 includes a base plate 344 defining a central aperture 346, a locking aperture 348 defined in its sidewall, and a pair of receivers 265 that are configured to receive protrusions 260 (FIG. 8) that depend downwardly from core insert 195' in a snap fit.

A "bumper knob" 350 is selectively rotatably secured to core base 342 by threaded fastener 380. A radial bearing 360 including an inner race 362, an outer race 364 and a plurality of rollers 366 is disposed between core base 342 and knob 350 to facilitate rotation of knob 350 relative to core base 342 while minimizing potential wear. Specifically, the outer race 364 of the radial bearing 360 is received adjacent the sidewall of the central aperture 346 whereas the inner race 362 is received adjacent the sidewall of an axial projection 354 that depends upwardly from the inner surface of the knob 350. A washer 382 that has a diameter that is greater than the inner diameter of the inner race 362 of the radial bearing 360 is disposed between a head of the threaded fastener 380 and the radial bearing 360, thereby securing the knob 350 to the bottom surface of the base plate 344. Note, radial bearing 360 is also configured to reduce friction in the axial direction between the base plate 344 and the knob 350.

A locking slide 370 including a locking projection 372 and a counterweight 376 is slidably disposed within the base plate 344 of the core base 342. As shown, the locking projection 372 and the counterweight 376 of the locking slide 370 extend radially outwardly from opposing portions of the substantially circular body 378 of the locking slide 370. The locking slide 370 is constrained within the base plate 344 of the core base 342 by channel base 349 for motion in the horizontal plane that is transverse to a longitudinal center axis of the trimmer head 25. More specifically, the motion of the locking slide 370 is restricted such that locking projection 372 and counterweight 376 are movable both radially inwardly and outwardly along an axis that is transverse to the longitudinal center axis of the trimmer head 25. A spring 374 exerts a radially outward biasing force on locking projection 372 such that the locking projection 372 extends radially outwardly through the locking aperture 348 of the base plate 344 when the trimmer head 25 is in the at-rest position, i.e., not rotating. A pair of lock recesses 352 is defined by the inner wall of the knob 350 and is configured to receive the locking projection 372 of the locking slide 370 therein, thereby non-rotatably fixing the knob 350 to the base plate 344 of the core base 342.

When the trimmer head is in the at-rest position, the knob 350 is non-rotatably fixed to the core base 342, which is in turn non-rotatably secured to the core insert 195' and the corresponding spool 130. As such, the knob 350 facilitates replenishment of the cutting line on the spool 130 when the trimmer head is in the at-rest position in the previously discussed manner. However, during trimming operations in which the trimmer head 25 is rotating, as the rotational speed of the trimmer head 25 increases, the counterweight 376 of the locking slide 370 begins to move radially outwardly away from the longitudinal center axis of the trimmer head 25, against the biasing force of the spring 374. As such, as the counterweight 376 moves farther radially outwardly away from the longitudinal center axis, the locking projection 372 moves radially inwardly toward the longitudinal center axis of the trimmer head 25. Eventually, the locking projection 372 is fully retracted from the corresponding lock recess 352 of the knob 350, at which point knob 350 is free to rotate in either direction with respect to the base plate 344 of the core base 342. Rotation of the knob 350 relative to the base plate 344 is facilitated by the radial bearing 360 that is disposed therebetween. In short, the knob 350 is free to rotate with respect to the trimmer head 25 during normal trimming operations, which leads to reduced wear of the knob 350 due to contact with various trimming operations, as well as line feed, or bump operations.

Figure 17:
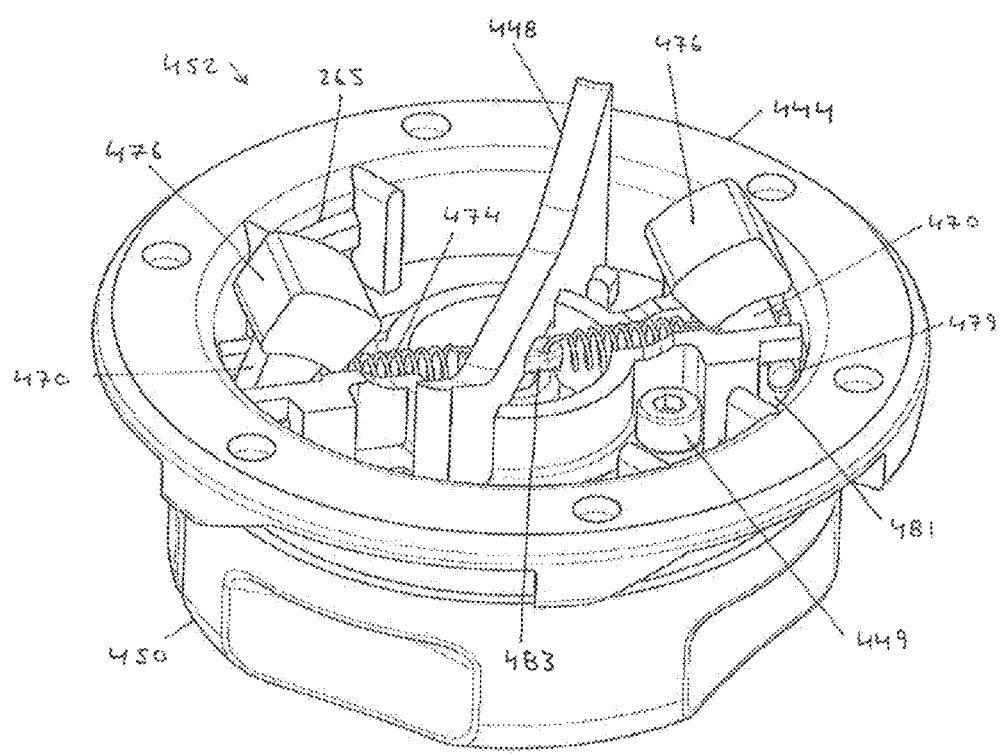
FIG. 17 illustrates a perspective view of a portion of an alternative line holding assembly in an assembled state accordance with an example embodiment.
Figure 18:
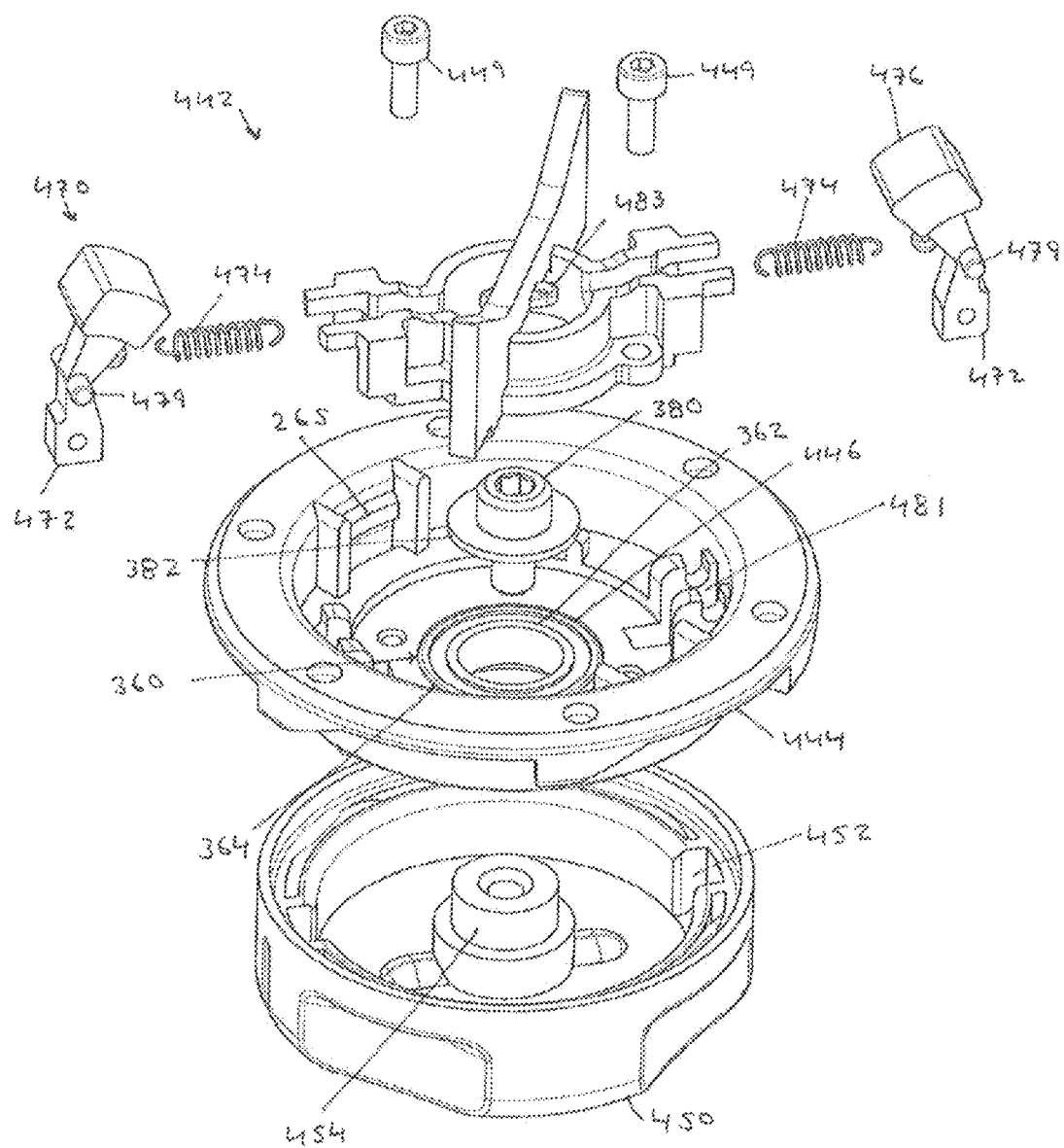
FIG. 18 illustrates an exploded perspective view of the portion of the alternative line holding assembly shown in FIG. 17.
Figure 19A:
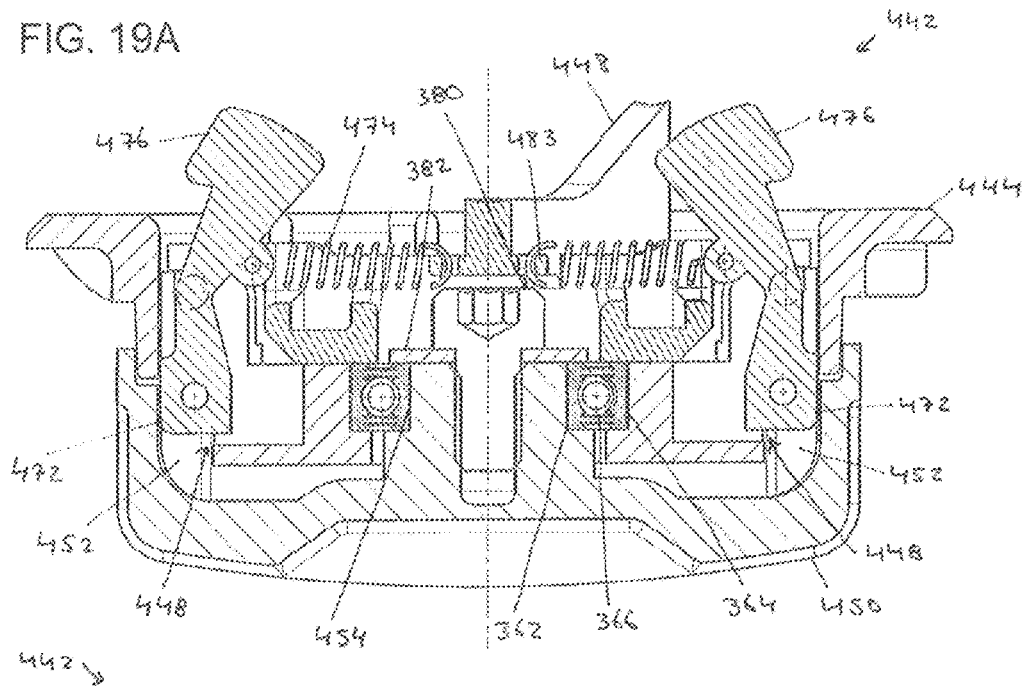
FIG. 19A illustrates a cross section view of the portion of the alternative line holding assembly shown in FIG. 17, in the at-rest position.
Figure 19B:
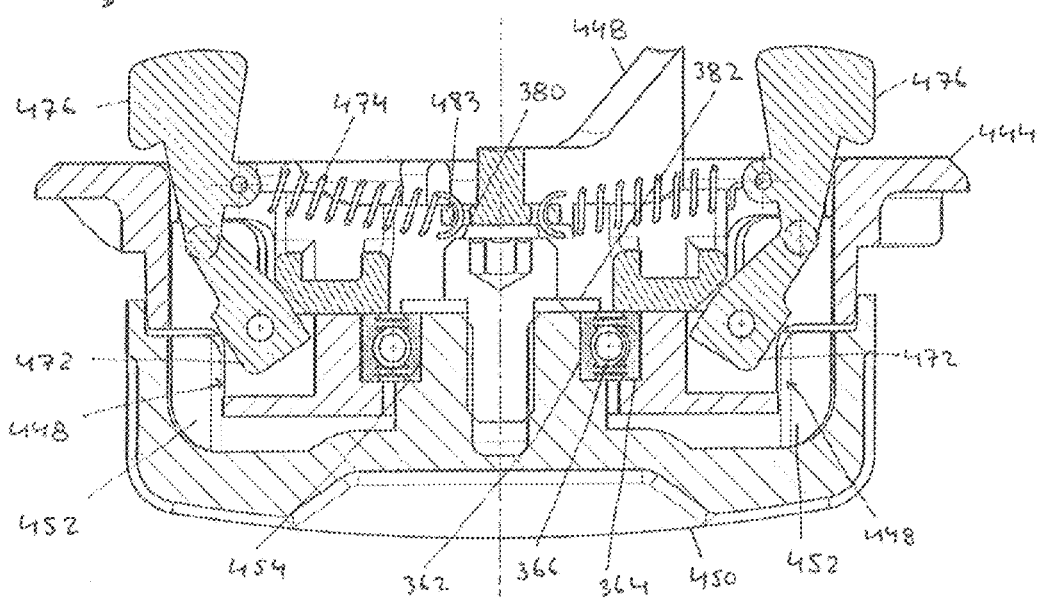
FIG. 19B illustrates the cross section view of the portion of the alternative line holding assembly shown in FIG. 17, in the in-use position.

Referring now to FIGS. 17, 18, 19A and 19B, an alternative core structure that could be employed in some embodiment is illustrated. Specifically, an alternative portion of the core of a line holding assembly is shown. FIG. 17 illustrates a top perspective view of an assembled core base 442 of a core 340 of the line holder assembly 310 (as shown in FIG. 14), and FIG. 18 illustrates an exploded perspective view of core base 442 shown in FIG. 17. FIGS. 19A and 19B show a cross-sectional view of the core base 442 shown in FIG. 17, in an at-rest position and an in-use, rotational position, respectively. The alternative core base portion 442 shown in FIGS. 17 through 19B is used with the trimmer head shown in FIGS. 13 and 14.

As previously discussed, the line holding assembly 310 may generally be inserted into the first housing portion 100 and second housing portion 120 described above, and the operation of the line holding assembly 310 may be substantially similar to the operations described above. However, the line holding assembly 310 of this example may include a multi-piece core including a core base 442 and a core insert 195', the core insert 195' being similar to that previously discussed with regard to the embodiment shown in FIGS. 7 through 12. As shown, the line holding assembly 310 employs a spool 130 as previously discussed with regard to the embodiment of FIGS. 2 through 6, but in alternate embodiments may include a spool 130' as previously discussed with regard to the embodiment shown in FIGS. 7 through 12.

The line holding assembly 310 also includes a line channel 390. The line channel 390 may be formed by core insert 195' that defines the side walls and top of the line channel 390 and a channel base 448 of the line channel 390 that is secured to the core base 442 by fasteners 449 and extends upwardly therefrom. As best seen in FIG. 18, the core base 442 includes a base plate 444 defining a central aperture 446, a pair of locking apertures 448 defined in its sidewall, and a pair of receivers 265 that are configured to receive protrusions 260 (FIG. 8) that depend downwardly from core insert 195' in a snap fit.

A "bumper knob" 450 is selectively rotatably secured to core base 442 by threaded fastener 380. A radial bearing 360 including an inner race 362, an outer race 364 and a plurality of rollers 366 is disposed between core base 442 and knob 450 to facilitate rotation of knob 350 relative to core base 342 while minimizing potential wear. Specifically, the outer race 364 of the radial bearing 360 is received adjacent the sidewall of the central aperture 346 whereas the inner race 362 is received adjacent the sidewall of an axial projection 354 that depends upwardly from the inner surface of the knob 350. A washer 382 that has a diameter that is greater than the inner diameter of the inner race 362 of the radial bearing 360 is disposed between a head of the threaded fastener 380 and the radial bearing 360, thereby securing the knob 350 to the bottom surface of the base plate 444. Note, radial bearing 360 is also configured to reduce friction in the axial direction between the base plate 344 and the knob 350.

A pair of locking levers 470, each locking lever 470 including a locking projection 472 at its first, or bottom, end and a counterweight 476 at its second, or top, end are pivotably disposed within the base plate 444 of the core base 442. As shown, the locking projection 472 and counterweight 476 of each locking lever 470 are disposed on opposite sides of a pair of mounting projections 479 that depend outwardly from opposite sides of the corresponding locking lever 470 at its approximate midpoint. Each locking lever 470 is pivotably supported on its pair of mounting projections 479 by a corresponding yoke 481 that depends upwardly from the bottom of the base plate 444. A spring 474 connects each locking lever 470 to a corresponding anchor point 483 that is disposed inwardly of the locking arm 470 such that the counterweight 476 of each locking arm 470 is biased radially inwardly by the corresponding spring 474. As such, the locking projection 472 of each locking lever 470 is biased radially outwardly by the corresponding spring 474 such that each locking projection extends radially outwardly through the adjacent locking aperture 448 of the base plate 444 when the trimmer head 25 is in the at-rest position, i.e., not rotating. A pair of lock recesses 452 are defined by the inner wall of the knob 450 and are configured to receive the locking projections 472 therein, thereby non-rotatably fixing the knob 450 to the base plate 444 of the core base 442.

When the trimmer head is in the at-rest position, the knob 450 is non-rotatably fixed to the core base 442, which is in turn non-rotatably secured to the core insert 195' and the corresponding spool 130. As such, the knob 450 facilitates replenishment of the cutting line on the spool 130 when the trimmer head is in the at-rest position in the previously described manner. However, during trimming operations in which the trimmer head 25 is rotating, as the rotational speed of the trimmer head 25 increases, the counterweights 476 of the locking levers 470 begin to move radially outwardly away from the longitudinal center axis of the trimmer head 25, against the biasing force of the spring 474. As such, as the counterweights 476 move farther radially outwardly away from the longitudinal center axis, the locking projections 472 moves radially inwardly toward the longitudinal center axis of the trimmer head 25. Eventually, the locking projections 472 are fully retracted from the corresponding lock recess 452 of the knob 450, at which point the knob 450 is free to rotate in either direction with respect to the base plate 444 of the core base 442. Rotation of the knob 450 relative to the base plate 444 is facilitated by the radial bearing 360 that is disposed therebetween. In short, the knob 450 is free to rotate with respect to the trimmer head 25 during normal trimming operations, which leads to reduced wear of the knob 450 due to contact with various trimming operations, as well as line feed, or bump operations.

In accordance with an example embodiment, a hand-held cutting device is provided. The device may include an elongated member graspable along a portion thereof by an operator, a trimmer head disposed at one end of the elongated member and configured to be rotatable to perform a cutting function using trimmer line held at a portion of the trimmer head, and a power unit operably coupled to the trimmer head to selectively cause rotation of the trimmer head via turning a shaft. The trimmer head may include a first housing portion, a line holding assembly to hold and selectively release the trimmer line, and a second housing portion operably coupled to the first housing portion to house the line holding assembly. The line holding assembly may include a spool configured to hold the trimmer line and a core operably coupled to the spool. The line holding assembly may be configured such that rotational movement of the core causes corresponding movement of the spool, but movement of the core in an axial direction does not cause corresponding movement of the spool. Some example embodiments may allow loading of trimmer line without opening the trimmer head in a simple and fast manner. Still example embodiments may generally not require a significant increase in part count, and may be useable regardless of the direction of rotation of the trimmer head (or even for dual direction trimmer heads). Example embodiments may be useful for holding line of different diameters and prevent axial movement of the spool (and the trimmer line) relative to the eyelets (i.e., orifices 128 on the second housing portion 120) on the trimmer head when a bump operation occurs or during reloading. Thus, the line may be less likely to be caught between the spool and the eyelet, and the line is also less likely to end up on the wrong side of a middle flange of the spool.

The device or trimmer head of some embodiments may include additional features that may be optionally added. For example, in some embodiments, (1) the first housing portion is operably coupled to the shaft and turns responsive to operation of the power unit. In an example embodiment, (2) the core comprises a line channel extending through the core in a radial direction to receive the trimmer line fed therethrough. In some embodiments, (3) the spool comprises a first flange and a second flange that extend in respective planes that are substantially parallel to each other and substantially perpendicular to the axial direction, and wherein the trimmer line extends out from opposing ends of the line channel and through channel portions in the spool to be wound onto the spool between the first and second flanges responsive to rotation of the core about the axial direction by the operator. In some cases, (4) the spool comprises a third flange disposed between the first and second flanges to divide the spool into a top line receiving portion and a bottom line receiving portion, and wherein the top line receiving portion receives trimmer line exiting one end of the line channel and the bottom line receiving portion receives trimmer line exiting the other end of the line channel. In an exemplary embodiment, (5) the line channel has a first width in the axial direction over a mid portion of the line channel, and wherein the line channel expands to a second width in the axial direction proximate to each of the opposing ends of the line channel. In some embodiments, (6) the line channel has a same width in the axial direction over an entirety of the line channel. In some examples, (7) the core is movable in the axial direction to release trimmer line from the spool, but the spool does not substantially move in the axial direction responsive to movement of the core in the axial direction. In some cases, (8) the spool is annularly shaped defining an inner periphery that slidably engages an outer periphery of a portion of the core relative to movement of the core in the axial direction. In an example embodiment, (9) the inner periphery of the spool comprises a vertical protrusion configured to ride in a corresponding vertical channel formed at the outer periphery of the core. In some embodiments, (10) the core is comprised of multiple portions, at least one of which is non-rotatably secured to the spool and one that is selectively rotatable relative to the spool and remainder of the core.

In some embodiments, any or all of (1) to (10) may be employed in addition to the optional modifications or augmentations described below. For example, in some embodiments, ends of the line channel are aligned with a line orifice on each respective opposing side of the spool. Alternatively or additionally, a length of the line channel is longer than a combined length of extension of the line orifice on each respective opposing side of the spool. Alternatively or additionally, the core comprises a top portion forming a top of the line channel and a separable bottom portion forming a bottom of the line channel. Alternatively or additionally, the device is a trimmer or edger. Alternatively or additionally, the power unit comprises an electric motor or a gasoline engine. Alternatively or additionally, the line channel includes at least one bend along a length thereof, the bend extending in the axial direction.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe exemplary embodiments in the context of certain exemplary combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. In cases where advantages, benefits or solutions to problems are described herein, it should be appreciated that such advantages, benefits and/or solutions may be applicable to some example embodiments, but not necessarily all example embodiments. Thus, any advantages, benefits or solutions described herein should not be thought of as being critical, required or essential to all embodiments or to that which is claimed herein. Although specific terms are employed herein, they are used in a generic and descriptive sense only and not for purposes of limitation.

That which is claimed:

1. A hand-held cutting device comprising:
    an elongated member graspable along a portion thereof by an operator;
    a trimmer head disposed at one end of the elongated member, the trimmer head configured to rotate to perform a cutting function using a trimmer line held by the trimmer head; and
    a power unit operably coupled to the trimmer head to selectively cause rotation of the trimmer head via turning a shaft;
    wherein the trimmer head comprises a line holding assembly comprising a spool and a core;
    wherein the spool is configured to hold the trimmer line and the spool is operably coupled to the core;
    wherein the core is comprised of a first core portion and a second core portion;
    wherein the second core portion is non-rotatably engaged with the first core portion when the trimmer head is in an at-rest state, and the second core portion is rotatable relative to the first core portion when the trimmer head is in an in-use state and rotating;
    wherein the first core portion comprises a locking projection operably coupled to a spring that applies a bias force on the locking projection in a direction away from an axis of rotation of the trimmer head;
    wherein the locking projection engages with a lock recess of the second core portion when the trimmer head is in the at-rest state;
    wherein the first core portion further comprises a counterweight operably coupled to the locking projection; and
    wherein, in response to rotation of the trimmer head, the counterweight moves radially outwards and away from the axis of rotation of the trimmer head causing the locking projection to move radially inwards towards the axis of rotation of the trimmer head, against the bias force, and out of engagement with the lock recess.

2. The hand-held cutting device of claim 1, wherein the locking projection and the counterweight are operably coupled to a locking slide having a substantially circular body.

3. The hand-held cutting device of claim 1, wherein the locking projection and the counterweight are operably coupled to a locking lever that is pivotally mounted to the first core portion.

4. The hand-held cutting device of claim 1, wherein the trimmer line extends outwardly from the trimmer head in two opposite directions through a first orifice and a second orifice of the trimmer head.

5. The hand-held cutting device of claim 1, wherein the line holding assembly is configured such that rotational movement of the core causes corresponding movement of the spool, but movement of the core in an axial direction does not cause corresponding movement of the spool.

6. The hand-held cutting device of claim 1, wherein a radial bearing is operably disposed between the first core portion and the second core portion.

7. The hand-held cutting device of claim 1, wherein the core comprises a line channel extending through the core in a radial direction to receive the trimmer line fed therethrough.

8. The hand-held cutting device of claim 1, wherein the spool is non-rotatably fixed to the first core portion.

9. The hand-held cutting device of claim 1, wherein the locking projection that is radially movable between a first radially outward position and a second radially inward position, and wherein, when the locking projection is in the second radially outward position, the locking projection is received into the lock recess thereby non-rotatably fixing the second core portion to the first core portion.

10. The hand-held cutting device of claim 1, wherein the locking projection is disposed on a first end of a locking lever that is pivotally secured to the first core portion.

11. The hand-held cutting device of claim 10, wherein the counterweight is disposed on a second end of the locking lever opposite the locking projection.

12. A trimmer head comprising:
    a line holding assembly comprising a spool and a core; and
    a housing configured to receiving at least a portion of the line holding assembly;

wherein the spool is configured to hold a trimmer line and the spool is operably coupled to the core;

wherein the core is comprised of a first core portion and a second core portion;

wherein the second core portion is non-rotatably engaged with the first core portion when the trimmer head is in an at-rest state, and the second core portion is rotatable relative to the first core portion when the trimmer head is in an in-use state and rotating;

wherein the first core portion comprises a locking projection operably coupled to a spring that applies a bias force on the locking projection in a direction away from an axis of rotation of the trimmer head;

wherein the locking projection engages with a lock recess of the second core portion when the trimmer head is in the at-rest state;

wherein the first core portion further comprises a counterweight operably coupled to the locking projection; and wherein, in response to rotation of the trimmer head, the counterweight moves radially outwards and away from the axis of rotation of the trimmer head causing the locking projection to move radially inwards towards the axis of rotation of the trimmer head, against the bias force, and out of engagement with the lock recess.

13. The trimmer head of claim 12, wherein the locking projection and the counterweight are operably coupled to a locking slide having a substantially circular body.

14. The trimmer head of claim 12, wherein the locking projection and the counterweight are operably coupled to a locking lever that is pivotally mounted to the first core portion.

15. The trimmer head of claim 12, wherein the trimmer line extends outwardly from the trimmer head in two opposite directions through a first orifice and a second orifice of the trimmer head.

16. A trimmer head comprising:
a spool; and
a core;

wherein the spool is configured to hold a trimmer line and the spool is operably coupled to the core;

wherein the core is comprised of a first core portion and a second core portion;

wherein the second core portion is non-rotatably engaged with the first core portion when the trimmer head is in an at-rest state, and the second core portion is rotatable relative to the first core portion when the trimmer head is in an in-use state and rotating;

wherein the first core portion comprises a locking projection operably coupled to a spring that applies a bias force on the locking projection in a direction away from an axis of rotation of the trimmer head;

wherein the locking projection engages with a lock recess of the second core portion when the trimmer head is in the at-rest state;

wherein the first core portion further comprises a counterweight operably coupled to the locking projection;

wherein, in response to rotation of the trimmer head, the counterweight moves radially outwards and away from the axis of rotation of the trimmer head causing the locking projection to move radially inwards towards the axis of rotation of the trimmer head, against the bias force, and out of engagement with the lock recess.

17. The trimmer head of claim 16, wherein the locking projection and the counterweight are operably coupled to a locking slide having a substantially circular body.

18. The trimmer head of claim 16, wherein the locking projection and the counterweight are operably coupled to a locking lever that is pivotally mounted to the first core portion.

* * * * *